United States Patent
Umeno

(10) Patent No.: US 7,231,048 B2
(45) Date of Patent: Jun. 12, 2007

(54) KEY SHARING SYSTEM, PUBLIC KEY CRYPTOSYSTEM, SIGNATURE SYSTEM, KEY SHARING APPARATUS, ENCRYPTION APPARATUS, DECRYPTION APPARATUS, SIGNATURE APPARATUS, AUTHENTICATION APPARATUS, KEY SHARING METHOD, ENCRYPTION METHOD, DECRYPTION METHOD, SIGNATURE METHOD, AUTHENTICATION METHOD, AND PROGRAMS

(75) Inventor: Ken Umeno, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 840 days.

(21) Appl. No.: 10/176,477

(22) Filed: Jun. 21, 2002

(65) Prior Publication Data

US 2002/0196945 A1 Dec. 26, 2002

(30) Foreign Application Priority Data

Jun. 21, 2001 (JP) ............................. 2001-188446

(51) Int. Cl.
*H04L 9/00* (2006.01)

(52) U.S. Cl. ...................................... 380/277; 380/278

(58) Field of Classification Search ................ 380/277, 380/278, 283, 285, 44, 45, 46, 28, 30, 263, 380/255, 47; 713/171, 176; 708/250, 491

See application file for complete search history.

(56) References Cited

U.S. PATENT DOCUMENTS

| | | | | | |
|---|---|---|---|---|---|
| 5,889,865 | A | * | 3/1999 | Vanstone et al. | ........... 713/171 |
| 5,953,420 | A | * | 9/1999 | Matyas et al. | .............. 713/171 |
| 6,788,788 | B1 | * | 9/2004 | Kasahara et al. | ........... 380/277 |
| 2002/0150237 | A1 | * | 10/2002 | DiSanto et al. | ............... 380/28 |

* cited by examiner

*Primary Examiner*—Hosuk Song
*Assistant Examiner*—Nirav Patel
(74) *Attorney, Agent, or Firm*—Mitchell P. Brook, Esq.; Luce, Forward, Hamilton & Scripps LLP

(57) ABSTRACT

A key sharing system is disclosed which uses a public key $X \in GF(n)$ ($2 \leq X < n$) which belongs to a Galois finite field $GF(n)$ for an integer n ($n \geq 2$), and a polynomial $T(\bullet, \bullet)$ defined in $GF(n)$ by $T(a, x) \equiv S(a, x) \bmod n$ where $S(\bullet, \bullet)$ is a Chebyshev polynomial defined by $S(a, \cos \theta) = \cos(a\theta)$ where a is an integer ($a \geq 2$). In a key sharing apparatus of this system, an integer obtaining unit obtains an integer p ($2 \leq p < n$), a transmission key calculation unit calculates a transmission key $Y \in GF(n)$ using the integer p based on $Y = T(p, X)$, a transmission key sending unit sends the transmission key Y to another key sharing apparatus, a transmission key reception unit receives a transmission key W from another key sharing apparatus, and a common key calculation unit calculates a common key $Z \in GF(n)$ using the transmission key W based on $Z = T(p, W)$.

21 Claims, 11 Drawing Sheets

CHEBYSHEV MAPS

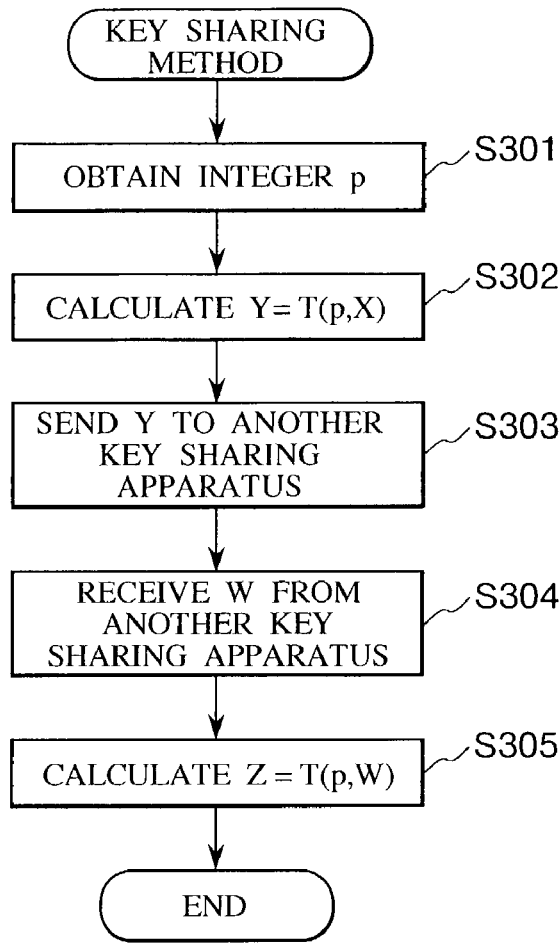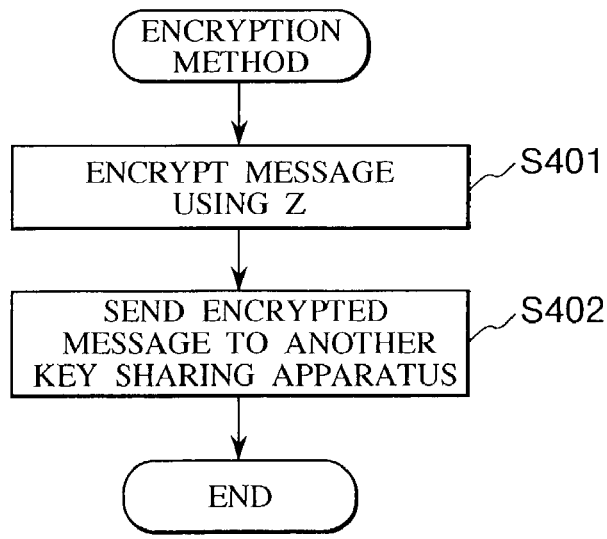

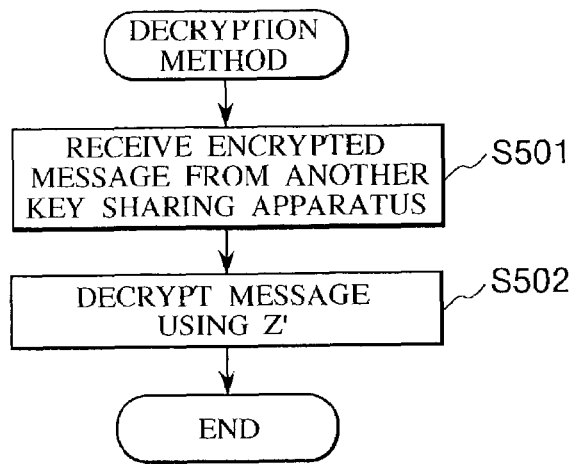
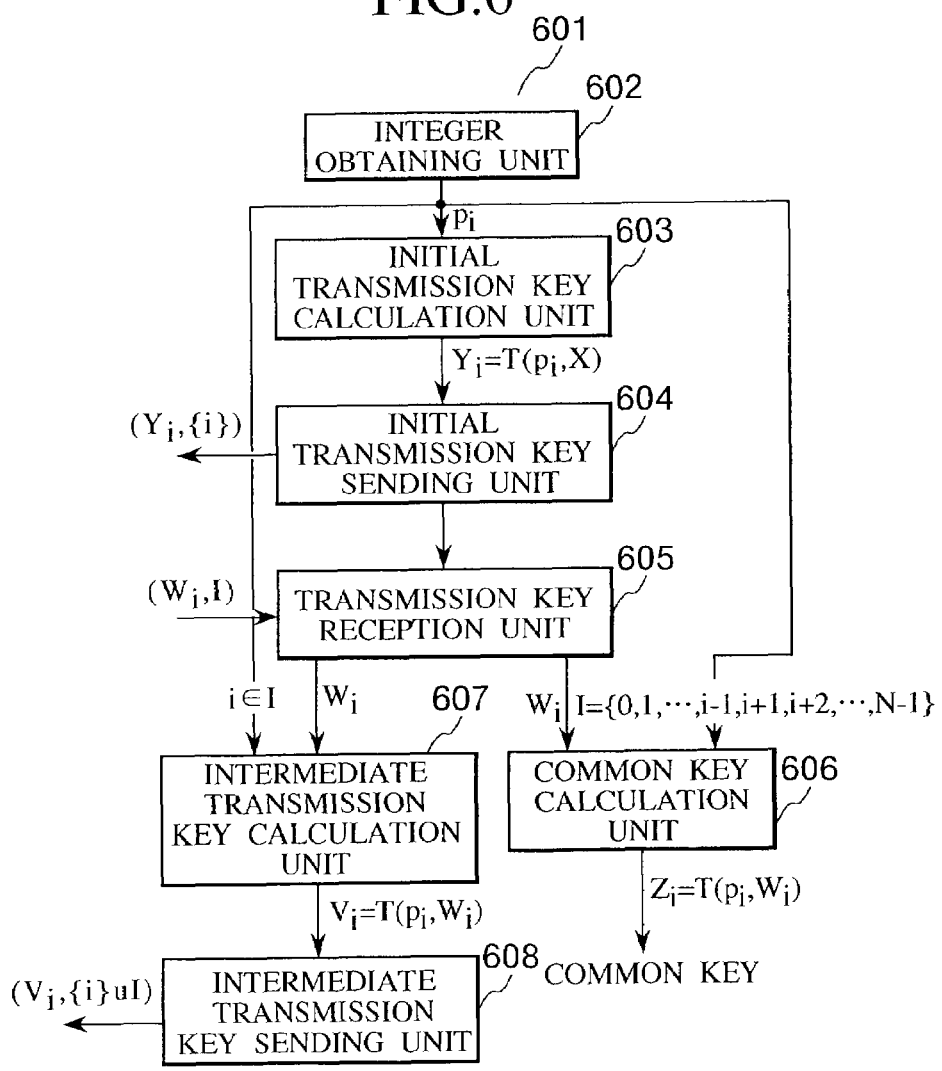

KEY SHARING SYSTEM, PUBLIC KEY CRYPTOSYSTEM, SIGNATURE SYSTEM, KEY SHARING APPARATUS, ENCRYPTION APPARATUS, DECRYPTION APPARATUS, SIGNATURE APPARATUS, AUTHENTICATION APPARATUS, KEY SHARING METHOD, ENCRYPTION METHOD, DECRYPTION METHOD, SIGNATURE METHOD, AUTHENTICATION METHOD, AND PROGRAMS

BACKGROUND OF THE INVENTION

1. Field of the Invention

The present invention relates to a key sharing system, a public key cryptosystem, a signature system, a key sharing apparatus, an encryption apparatus, a decryption apparatus, a signature apparatus, an authentication apparatus, a key sharing method, an encryption method, a decryption method, a signature method, an authentication method, and programs for controlling computers to act as the above apparatuses.

2. Description of the Related Art

Conventionally, key cryptosystems employing a public key and a secret key have been used. Now that security for data communications is more highly required, such public key cryptosystems are attracting more and more attention. Signature systems for attaching a signature to messages to be transmitted, are also becoming popular.

In addition, since encryption using a public key plus decryption using a secret key requires a large amount of calculations, an alternative method of encrypting a message with a common key, encrypting this common key with a public key, and sending the message together with both the keys, and decrypting the encrypted common key with a secret key on the receiver-side, so as to decrypt the message using the decrypted common key, is also widely used.

With today's growing awareness of security, it is more demanded that key sharing systems, public key cryptosystems, and signature systems realize a system that needs only a small amount of calculations in encryption and decryption, while keeping high security.

The present invention has been made to solve the above problem, and it is an object of the present invention to provide a key sharing system, a public key cryptosystem, a signature system, a key sharing apparatus, an encryption apparatus, a decryption apparatus, a signature apparatus, an authentication apparatus, a key sharing method, an encryption method, a decryption method, a signature method, an authentication method, and programs for controlling computers to act as the above apparatuses.

SUMMARY OF THE INVENTION

To accomplish the above object, the following invention will be disclosed, in accordance with the principle of this invention.

A key sharing system according to a first aspect of the present invention enables a first key sharing apparatus and a second key sharing apparatus to share a key, using a public key $X \in GF(n)$ which belongs to a Galois finite field $GF(n)$ for an integer n ($n \geq 2$), and which is equal to or larger than 2 and smaller than n, and a polynomial $T(\cdot, \cdot)$ which is defined in the Galois finite field $GF(n)$ by $$T(a, x) \equiv S(a, x) \bmod n$$

where $S(\cdot, \cdot)$ is a Chebyshev polynomial defined by $$S(a, \cos \theta) = \cos(a\theta)$$

where a is an integer ($a \geq 2$), wherein:

(a) the first key sharing apparatus comprises
  an integer obtaining unit which obtains an integer p which is equal to or larger than 2, and smaller than n,
  a transmission key calculation unit which calculates a transmission key $Y \in GF(n)$ using the obtained integer p based on the following equation $$Y = T(p, X), \text{ and}$$

a transmission key sending unit which sends the calculated transmission key Y to the second key sharing apparatus;

(b) the second key sharing apparatus comprises
  an integer obtaining unit which obtains an integer q which is equal to or larger than 2, and smaller than n,
  a transmission key calculation unit which calculates a transmission key $W \in GF(n)$ using the obtained integer q based on the following equation $$W = T(q, X), \text{ and}$$

a transmission key sending unit which sends the calculated transmission key W to the first key sharing apparatus;

(c) the first key sharing apparatus further comprises
  a transmission key reception unit which receives the transmission key W sent from the second key sharing apparatus, and
  a common key calculation unit which calculates a common key $Z \in GF(n)$ using the received transmission key W based on the following equation $$Z = T(p, W); \text{ and}$$

(d) the second key sharing apparatus further comprises
  a transmission key reception unit which receives the transmission key Y sent from the first key sharing apparatus, and
  a common key calculation unit which calculates a common key $Z' \in GF(n)$ using the received transmission key Y based on the following equation $$Z' = T(q, Y).$$

The first key sharing apparatus may further comprise:
  an encryption unit which encrypts a message to be transmitted using the calculated common key Z to obtain an encrypted message; and
  an encrypted message sending unit which sends the encrypted message to the second key sharing apparatus.

The second key sharing apparatus may further comprise:
  an encrypted message reception unit which receives the encrypted message sent from the first key sharing apparatus; and
  a decryption unit which decrypts the received encrypted message using the calculated common key Z' to obtain the message to be transmitted.

A key sharing system according to a second aspect of the present invention enables a key to be shared among N ($N \geq 2$) number of key sharing apparatuses $M_0, M_1, \ldots, M_{N-1}$, using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), wherein the key sharing apparatus $M_i$ ($0 \leq i \leq N-1$) comprises:
 an integer obtaining unit which obtains an integer $p_i$ which is equal to or larger than 2 and smaller than n;
 an initial transmission key calculation unit which calculates a transmission key $Y_i$ using the obtained integer $p_i$ based on the following equation $$Y_i = T(p_i, X);$$

an initial transmission key sending unit which sends the calculated transmission key $Y_i$ and polynomial application information representing that only the key sharing apparatus $M_i$ applies the polynomial to obtain the transmission key $Y_i$, to another key sharing apparatus among the plurality of key sharing apparatuses;
 a transmission key reception unit which receives a transmission key $W_i \in GF(n)$ and polynomial application information regarding the transmission key $W_i \in GF(n)$, from another key sharing apparatus among the plurality of key sharing apparatuses;
 a common key calculation unit which calculates a common key $Z_i$ using the obtained integer $p_i$ and the received transmission key $W_i$ based on the following equation $$Z_i = T(p_i, W_i),$$

in a case where the received polynomial application information represents that all the key sharing apparatuses among the plurality of key sharing apparatuses except the key sharing apparatus $M_i$ have applied the polynomial;
 an intermediate transmission key calculation unit which calculates a transmission key $V_i$ using the obtained integer $p_i$ and the received transmission key $W_i$ based on the following equation $$V_i = T(p_i, W_i),$$

in a case where the received polynomial information does not represent so; and
 an intermediate transmission key sending unit which sends the calculated transmission key $V_i$ and the received polynomial application information to which information representing that the key sharing apparatus $M_i$ has applied the polynomial is added, to another key sharing apparatus among the plurality of key sharing apparatus.

Each of the initial transmission key sending unit and intermediate transmission key sending unit of the key sharing apparatus $M_i$ sends the transmission key and the polynomial application information to a key sharing apparatus $M_{(i+1) \bmod N}$.

The transmission key reception unit of the key sharing apparatus $M_i$ receives the transmission key and the polynomial application information from a key sharing apparatus $M_{(i-1) \bmod N}$.

Among the plurality of key sharing apparatuses:
 a key sharing apparatus $M_s$ ($0 \leq s \leq N-1$) may further comprise
  an encryption unit which encrypts a message to be transmitted using the calculated common key $Z_s$ to obtain an encrypted message, and
  an encrypted message sending unit which sends the encrypted message to the key sharing apparatus $M_t$; and
 a key sharing apparatus $M_t$ ($0 \leq t \leq N-1$, $t \neq s$) may further comprise
  an encrypted message reception unit which receives the encrypted message sent from the key sharing apparatus $M_s$, and
  a decryption unit which decrypts the received encrypted message using the calculated common key $Z_t$ to obtain the message to be transmitted.

In the above key sharing systems, the integer n is defined as $$n = c^m$$

where c is a prime number, and m is an integer equal to or larger than 2.

A public key cryptosystem according to a third aspect of the present invention is a cryptosystem in which an encryption apparatus sends a message to a decryption apparatus, using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos\theta) = \cos(a\theta)$$

where a is an integer ($a \geq 2$), wherein:
 (a) the decryption apparatus comprises
  a secret key obtaining unit which obtains a secret key p which is an integer equal to or larger than 2,
  a natural number obtaining unit which obtains a natural number k which is prime to "p−1" (where p is the obtained secret key) and equal to or larger than 2,
  a public key calculation unit which calculates a public key $Y \in GF(n)$ using the secret key p and the public key X based on the following equation $$Y = T(p, X), \text{ and}$$

a public key disclosing unit which discloses the natural number k and the public key Y to the encryption apparatus;
 (b) the encryption apparatus comprises
  a public key reception unit which receives the natural number k and the public key Y disclosed by the decryption unit,
  an encryption unit which calculates an encrypted message (a, b) using a message $m \in GF(n)$ based on the following equations $$a = T(k, X)$$

$$b = mT(k, Y) \bmod n, \text{ and}$$

an encrypted message sending unit which sends the encrypted message (a, b) to the decryption apparatus; and
 (c) the decryption apparatus further comprises
  an encrypted message reception unit which receives the encrypted message (a, b) sent from the encryption apparatus, and a decryption unit which calculates a message m'∈GF(n) using the secret key p and the received encrypted message (a, b) based on the following equation $m'=b/T(p, a) \bmod n.$ The encryption apparatus may further comprise:

a message reception unit which receives a message M to be transmitted; and a hash calculation unit which obtains the message m, using the received message M and a hash function H(•) for mapping the message M over GF(n) based on the following equation $m=H(M).$ The decryption unit may further comprise a message obtaining unit which obtains a message M' to be transmitted, using the obtained message m' and an inverse function $H^{-1}(•)$ of the hash function H(•) based on the following equation $M'=H^{-1}(m').$ A signature system according to a fourth aspect of the present invention is a system in which a signature apparatus sends a message to an authentication apparatus, using a Galois finite field GF(n) for an integer n (n≧2), a polynomial T(•, •) which is defined in the Galois finite field GF(n) by $T(a, x) \equiv S(a, x) \bmod n$ where S(•, •) is a Chebyshev polynomial defined by $S(a, \cos \theta) = \cos(a\theta)$ where a is an integer (a≧2), and a lowest positive integer n* which satisfies $T(b+n^*, U) = T(b, U)$ where b is an arbitrary positive integer, and U is an arbitrary integer (U∈GF(n)), wherein:

(a) the signature apparatus comprises an integer selection unit which selects an integer p (2≦p<min(n*, n−1)), and an integer k (2≦k<min (n*, n−1), k≠p), a public key calculation unit which calculates a public key Y∈GF(n) using the integer p, based on the following equation $Y=T(p, X),$ a public key disclosing unit which discloses the public key Y to the authentication apparatus, a signature unit which calculates a signature-affixed message (r, s, m) using a message m∈GF(n), based on the following equations $r=T(k, X)$ $s=(m+pr)/k \bmod n,$ and a signature-affixed message sending unit which sends the signature-affixed message (r, s, m) to the authentication apparatus; and (b) the authentication apparatus comprises a public key reception unit which receives the public key Y disclosed by the signature apparatus, a signature-affixed message reception unit which receives the signature-affixed message (r, s, m) sent from the signature apparatus, a parameter calculation unit which calculates the following parameters $w=1/s \bmod n^*$ $u_1=mw \bmod n^*$ $u_2=rw \bmod n^*$ $v=T(u_1+u_2, Y)$ using the received public key Y and the received signature-affixed message (r, s, m), and an authentication unit which authenticates the signature-affixed message (r, s, m), in a case where it is satisfied that r=v (v is the calculated parameter, and r is an element of the signature-affixed message (r, s, m)).

In the signature apparatus, in a case where the value s calculated by the signature unit is equal to 0, the integer selection unit reselects another integer as the integer k.

The signature apparatus may further comprise:

a message reception unit which receives a message M to be transmitted; and a hash calculation unit which obtains the message m, using the received message M, and a hash function H(•) for mapping the message M over GF(n), based on the following equation $m=H(M).$ The authentication apparatus may further comprise a message obtaining unit which obtains the message M to be transmitted, using the signature-affixed message (r, s, m), and an inverse function $H^{-1}(•)$ of the hash function H(•), based on the following equation $M=H^{-1}(m).$ A key sharing apparatus according to a fifth aspect of the present invention is the first key sharing apparatus employed in the key sharing system according to the first aspect of the present invention.

A key sharing apparatus according to a sixth aspect of the present invention is the second key sharing apparatus employed in the key sharing system according to the first aspect of the present invention.

A key sharing apparatus according to a seventh aspect of the present invention is the key sharing apparatus employed in the key sharing system according to the second aspect of the present invention.

An encryption apparatus according to an eighth aspect of the present invention is the encryption apparatus employed in the public key cryptosystem according to the third aspect of the present invention.

A decryption apparatus according to a ninth aspect of the present invention is the decryption apparatus employed in the public key cryptosystem according to the third aspect of the present invention.

A signature apparatus according to a tenth aspect of the present invention is the signature apparatus employed in the signature system according to the fourth aspect of the present invention.

An authentication apparatus according to an eleventh aspect of the present invention is the authentication apparatus employed in the signature system according to the fourth aspect of the present invention.

A key sharing method according to a twelfth aspect of the present invention is a method which uses a public key X∈GF(n) which belongs to a Galois finite field GF(n) for an integer n (n≧2), and which is equal to or larger than 2 and smaller than n, and a polynomial $T(\bullet, \bullet)$ which is defined in the Galois finite field GF(n) by $$T(a, x) \equiv S(a, x) \bmod n$$

where $S(\bullet,\bullet)$ is a Chebyshev polynomial defined by $$S(a, \cos \theta) = \cos(a\theta)$$

where a is an integer ($a \geq 2$), the method comprising:
- an integer obtaining step of obtaining an integer p which is equal to or larger than 2, and smaller than n;
- a transmission key calculating step of calculating a transmission key $Y \in GF(n)$ using the obtained integer p, based on the following equation $$Y = T(p, X);$$

- a transmission key sending step of sending the calculated transmission key Y to another key sharing apparatus;
- a transmission key receiving step of receiving a transmission key W sent from the "another" key sharing apparatus; and
- a common key calculating step of calculating a common key $Z \in GF(n)$ using the received transmission key W, based on the following equation $$Z = T(p, W).$$

A key sharing method to be described below forms a combination with the above key sharing method, and uses a public key $X \in GF(n)$ which belongs to a Galois finite field GF(n) for an integer n ($n \geq 2$), and which is equal to or larger than 2 and smaller than n, and a polynomial $T(\bullet, \bullet)$ which is defined in the Galois finite field GF(n) by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), the method comprising:
- an integer obtaining step of obtaining an integer q which is equal to or larger than 2, and smaller than n;
- a transmission key calculating step of calculating a transmission key $W \in GF(n)$ using the obtained integer q, based on the following equation $$W = T(q, X);$$

- a transmission key sending step of sending the calculated transmission key W to another key sharing apparatus;
- a transmission key receiving step of receiving a transmission key Y sent from the "another" key sharing apparatus; and
- a common key calculating step of calculating a common key $Z' \in GF(n)$ using the received transmission key Y, based on the following equation $$Z' = T(q, Y).$$

The key sharing method may further comprise:
- a encrypting step of encrypting a message to be transmitted using the calculated common key Z, to obtain an encrypted message; and
- an encrypted message sending step of sending the encrypted message to the "another" key sharing apparatus.

The key sharing method may further comprise:
- an encrypted message receiving step of receiving an encrypted message sent from the "another" key sharing apparatus; and
- a decrypting step of decrypting the received encrypted message using the calculated common key Z', to obtain a message to be transmitted.

A key sharing method according to a thirteenth aspect of the present invention is a method [1] which enables a key to be shared among N ($N \geq 2$) number of key sharing apparatuses $M_0, M_1, \ldots, M_{N-1}$, with the use of a public key $X \in GF(n)$ which belongs to a Galois finite field GF(n) for an integer n ($n \geq 2$), and which is equal to or larger than 2 and smaller than n, and a polynomial $T(\bullet, \bullet)$ which is defined in the Galois finite field GF(n) by $$i\ T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), and [2] which is performed by the key sharing apparatus $M_i$ ($0 \leq i \leq N-1$), the method comprising:
- an integer obtaining step of obtaining an integer $p_i$ which is equal to or larger than 2, and smaller than n;
- an initial transmission key calculating step of calculating a transmission key $Y_i$, using the obtained integer $p_i$, based on the following equation $$Y_i = T(p_i, X);$$

- an initial transmission key sending step of sending the calculated transmission key $Y_i$, and polynomial application information representing that only the key sharing apparatus $M_i$ has applied the polynomial to calculate the transmission key $Y_i$, to another key sharing apparatus among the plurality of key sharing apparatuses;
- a transmission key receiving step of receiving a transmission key $W_i \in GF(n)$ and polynomial application information regarding the transmission key $W_i \in GF(n)$, from another key sharing apparatus among the plurality of key sharing apparatuses
- a common key calculating step of calculating a common key $Z_i$, using the obtained integer $p_i$ and the received transmission key $W_i$, based on the following equation $$Z_i = T(p_i, W_i)$$

in a case where the received polynomial application information represents that all the key sharing apparatuses among the plurality of key sharing apparatuses except the key sharing apparatus $M_i$ have applied the polynomial;
- an intermediate transmission key calculating step of calculating a transmission key $V_i$, using the obtained integer $p_i$ and the received transmission key $W_i$, based on the following equation $$V_i = T(p_i, W_i)$$

in a case where the received polynomial application information does not represent so; and
- an intermediate transmission key sending step of sending the calculated transmission key $V_i$ and the received polynomial application information to which information representing that the key sharing apparatus $M_i$ has applied the polynomial is added, to another key sharing apparatus among the plurality of key sharing apparatus.

In each of the initial transmission key sending step and intermediate transmission key sending step, the transmission key and the polynomial application information are sent to a key sharing apparatus $M_{(i+1) \bmod N}$.

In the transmission key receiving step, the transmission key and the polynomial application information are received from a key sharing apparatus $M_{(i-1) \bmod N}$.

The key sharing method may be performed by a key sharing apparatus $M_s$ ($0 \leq s \leq N-1$) when a message is sent from the key sharing apparatus $M_s$ to a key sharing apparatus $M_t$ ($0 \leq t \leq N-1$, $t \neq s$) among the plurality of key sharing apparatuses, and may further comprise:

an encrypting step of encrypting a message to be transmitted using the calculated common key $Z_s$, to obtain an encrypted message; and an encrypted message sending step of sending the encrypted message to the key sharing apparatus $M_t$.

The key sharing method may be performed by a key sharing apparatus $M_t$ ($0 \leq t \leq N-1$) when a message is sent from a key sharing apparatus $M_s$ ($0 \leq s \leq N-1$, $s \neq t$) to the key sharing apparatus $M_t$ among the plurality of key sharing apparatuses, and may further comprise:

an encrypted message receiving step of receiving an encrypted message sent from the key sharing apparatus $M_s$; and a decrypting step of decrypting the received encrypted message using the calculated common key $Z_t$, to obtain a message to be transmitted.

In the above key sharing methods, the integer n may be defined as $$n = c^m$$

where c is a prime number, and m is an integer equal to or larger than 2.

An encryption method according to a fourteenth aspect of the present invention is a method using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), the method comprising:

a public key receiving step of receiving a natural number k and a public key Y which are disclosed by a decryption apparatus;

an encrypting step of calculating an encrypted message (a, b) using a message $m \in GF(n)$, based on the following equations $$a = T(k, X)$$

$$b = mT(k, Y) \bmod n; \text{ and}$$

an encrypted message sending step of sending the encrypted message (a, b) to the decryption apparatus.

The encryption method may further comprise:

a message receiving step of receiving a message M to be transmitted; and a hash calculating step of obtaining the message m, using the received message M and a hash function $H(\bullet)$ for mapping the message M over $GF(n)$, based on the following equation $$m = H(M).$$

A decryption method according to a fifteenth aspect of the present invention is a method using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), the method comprising:

a secret key obtaining step of obtaining a secret key p which is an integer equal to or larger than 2;

a natural number obtaining step of obtaining a natural number k which is prime to p−1 (where p is the obtained secret key) and equal to or larger than 2;

a public key calculating step of calculating a public key $Y \in GF(n)$ using the secret key p and the public key X, based on the following equation $$Y = T(p, X);$$

a public key disclosing step of disclosing the natural number k and the public key Y to an encryption apparatus;

an encrypted message receiving step of receiving an encrypted message (a, b) sent from the encryption apparatus; and a decrypting step of calculating a message $m' \in GF(n)$, using the secret key p and the received encrypted message (a, b), based on the following equation $$m' = b/T(p, a) \bmod n.$$

The decryption method may further comprise a message obtaining step of obtaining a message M' to be transmitted, using the calculated message m' and an inverse function $H^{-1}(\bullet)$ of a hash function $H(\bullet)$ which is used by the encryption apparatus, based on the following equation $$M' = H^{-1}(m').$$

A signature method according to a sixteenth aspect of the present invention is a method using a Galois finite field $GF(n)$ for an integer n ($n \geq 2$), a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), and a lowest positive integer n* which satisfies $$T(b+n^*, U) = T(b, U)$$

where b is an arbitrary positive integer, and U is an arbitrary integer ($U \in GF(n)$), the method comprising:

an integer selecting step of selecting an integer p ($2 \leq p < \min(n^*, n-1)$) and an integer k ($2 \leq k < \min(n^*, n-1)$, $k \neq p$);

a public key calculating step of calculating a public key $Y \in GF(n)$, using the integer p, based on the following equation $$Y = T(p, X);$$

a public key disclosing step of disclosing the public key Y to an authentication apparatus;

a signature calculating step of calculating a signature-affixed message (r, s, m) using a message m∈GF(n), based on the following equations $$r = T(k, X)$$

$$s = (m + pr)/k \bmod n; \text{ and}$$

a signature-affixed message sending step of sending the signature-affixed message (r, s, m) to the authentication apparatus.

In a case where the value s calculated in the signature calculating step is equal to 0, another integer is reselected as the integer k in the integer selecting step.

The signature method may further comprise:

a message receiving step of receiving a message M to be transmitted; and a hash calculating step of obtaining the message m, using the received message M and a hash function H(•) for mapping the message M over GF(n), based on the following equation $$m = H(M).$$

An authentication method according to a seventeenth aspect of the present invention is a method using a Galois finite field GF(n) for an integer n (n≥2), a polynomial T(•, •) which is defined in the Galois finite field GF(n) by $$T(a, x) \equiv S(a, x) \bmod n$$

where S(•, •) is a Chebyshev polynomial defined by $$S(a, \cos\theta) = \cos(a\theta)$$

where a is an integer (a≥2), and a lowest positive integer n* which satisfies $$T(b + n^*, U) = T(b, U)$$

where b is an arbitrary positive integer, and U is an arbitrary integer (U∈GF(n)), the method comprising:

a public key receiving step of receiving a public key Y disclosed by a signature apparatus;

a signature-affixed message receiving step of receiving a signature-affixed message (r, s, m) sent from the signature apparatus;

a parameter calculating step of calculating the following parameters $$w = 1/s \bmod n^*$$

$$u_1 = mw \bmod n^*$$

$$u_2 = rw \bmod n^*$$

$$v = T(u_1 + u_2, Y)$$

using the received public key Y and the received signature-affixed message (r, s, m); and an authenticating step of authenticating the signature-affixed message (r, s, m), in a case where it is true that r=v (v is the calculated parameter, and r is an element of the signature-affixed message (r, s, m)).

The authentication method may further comprise a message obtaining step of obtaining a message M to be transmitted, using the signature-affixed message (r, s, m) and an inverse function $H^{-1}(•)$ of a hash function H(•) which is used by the signature apparatus, based on the following equation $$M = H^{-1}(m).$$

A program according to an eighteenth aspect of the present invention controls a computer to function as the key sharing apparatus according to the fifth aspect of the present invention.

A program according to a nineteenth aspect of the present invention controls a computer to function as the key sharing apparatus according to the sixth aspect of the present invention.

A program according to a twentieth aspect of the present invention controls a computer to function as the key sharing apparatus according to the seventh aspect of the present invention.

A program according to a twenty-first aspect of the present invention controls a computer to function as the encryption apparatus according to the eighth aspect of the present invention.

A program according to a twenty-second aspect of the present invention controls a computer to function as the decryption apparatus according to the ninth aspect of the present invention.

A program according to a twenty-third aspect of the present invention controls a computer to function as the signature apparatus according to the tenth aspect of the present invention.

A program according to a twenty-fourth aspect of the present invention controls a computer to function as the authentication apparatus according to the eleventh aspect of the present invention.

BRIEF DESCRIPTION OF THE DRAWINGS

These objects and other objects and advantages of the present invention will become more apparent upon reading of the following detailed description and the accompanying drawings in which:

FIG. 3 is a flowchart showing a flow of a process of a key sharing method performed by a first key sharing apparatus;

FIG. 4 is a flowchart showing a flow of a process of an encryption method performed by the first key sharing apparatus;

FIG. 5 is a flowchart showing a flow of a process of a decryption method performed by a second key sharing apparatus;

FIG. 6 is an exemplary diagram showing a schematic structure of a key sharing apparatus $M_i$ according to a second embodiment;

DETAILED DESCRIPTION OF THE PREFERRED EMBODIMENTS

Embodiments of the present invention will now be explained. The embodiments to be explained are for the sake of explanation, and not intended to limit the scope of the present invention. Accordingly, even though one with ordinary skill in the art can employ another embodiment wherein individual elements or all elements of the present invention are replaced with equivalents of those, such embodiment is to be included in the scope of the present invention.

First Embodiment

Figure 1:
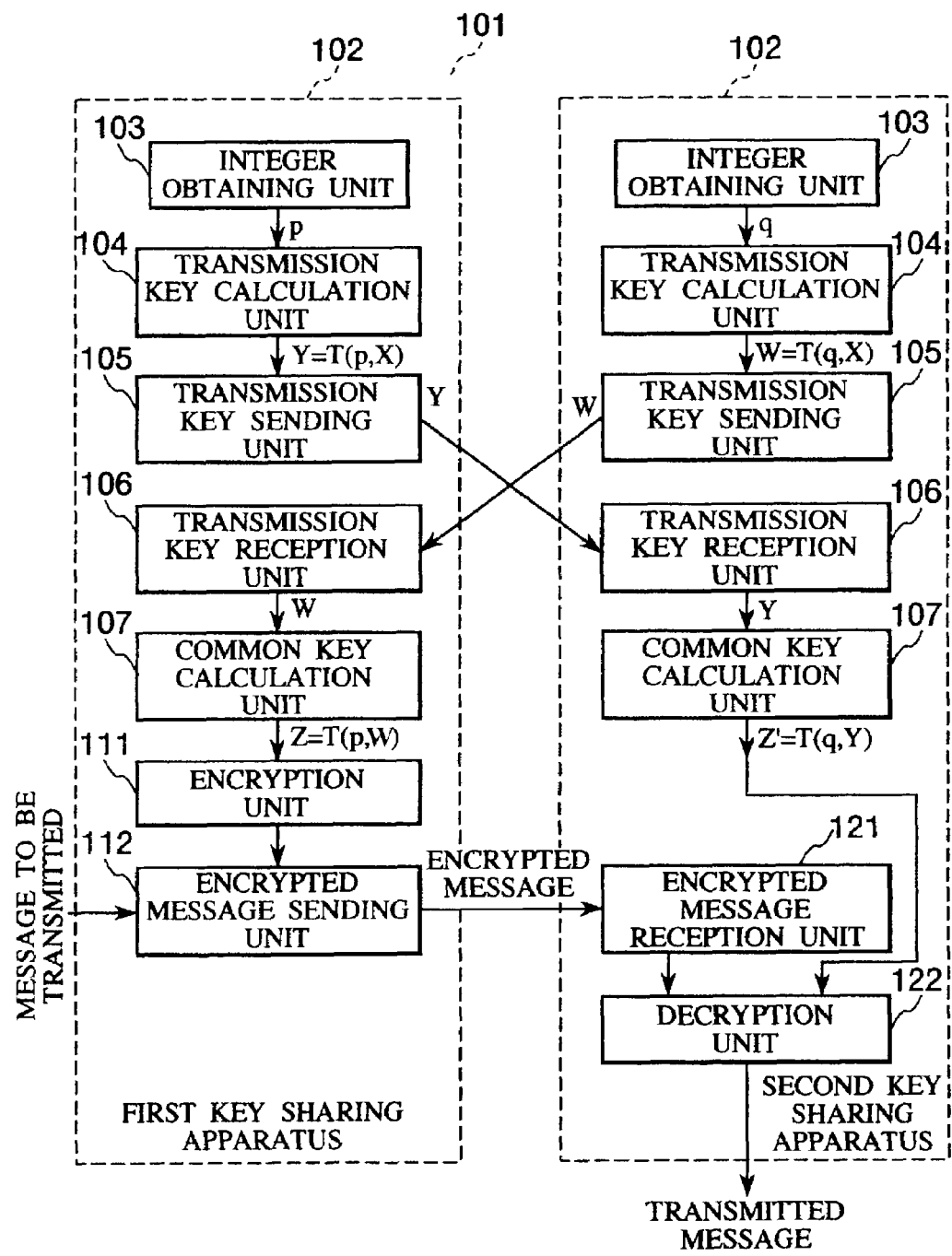
FIG. 1 is an exemplary diagram showing a schematic structure of a key sharing system according to a first embodiment of the present invention.

FIG. 1 is an exemplary diagram showing a schematic structure of a key sharing system according to a first embodiment of the present invention. The following explanation will be made with reference to this drawing.

A key sharing system 101 comprises a first key sharing apparatus 102 and a second key sharing apparatus 102 which share between them, a key used for encryption when transmitting a message, which will be described later.

Each key sharing apparatus 102 comprises an integer obtaining unit 103, a transmission key calculation unit 104, a transmission key sending unit 105, a transmission key reception unit 106, and a common key calculation unit 107. Illustrated elements other than the above are to be described later.

The key sharing system 101 uses a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$).

Figure 2:
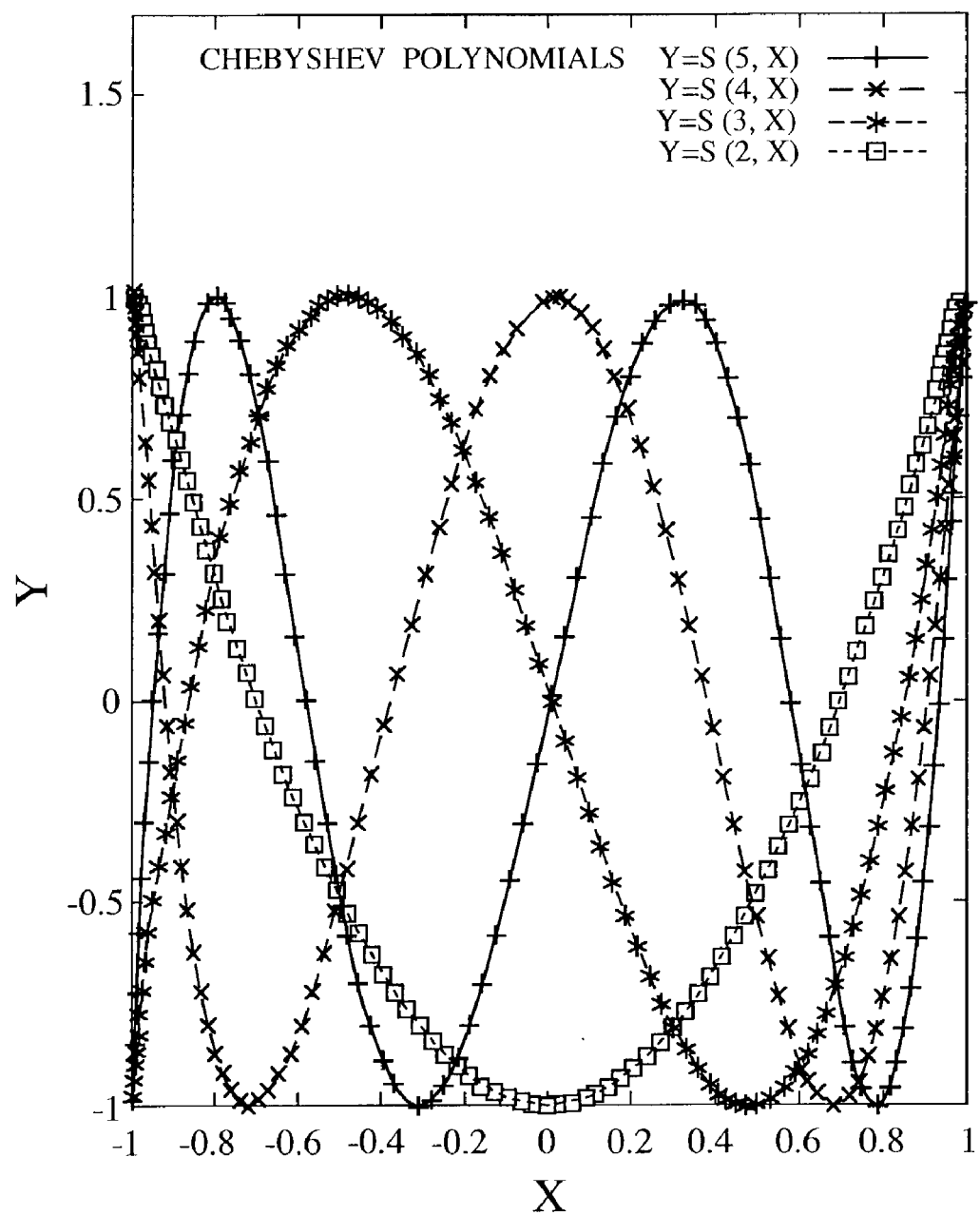
FIG. 2 is a graph showing a correspondence between values to be substituted in a Chebyshev polynomial S(•, •) when it is used as a function, and the resultant values of calculation.

FIG. 2 is a graph showing correspondence between values to be substituted in the Chebyshev polynomial $S(\bullet, \bullet)$ when it is used as a function, and the resultant values obtained by calculating the Chebyshev polynomial. Specifically, the Chebyshev polynomial can be represented as the following equations.

$$S(1, x) = x;$$

$$S(2, x) = 2x^2 - 1;$$

$$S(3, x) = 4x^3 - 3x;$$

$$S(4, x) = 8x^4 - 8x^2 - 1;$$

Here, it is supposed that the Chebyshev polynomial $S(\bullet, \bullet)$ is calculated in the Galois finite field $GF(n)$. The calculation result is referred to as $T(\bullet, \bullet)$. A calculation using "mod" allows an overflow or underflow which occurs during the calculation to be ignored. Performing such a calculation just corresponds to performing the four basic arithmetic operations in an ordinary computer.

As described, in the present embodiment, a necessary calculation can be performed using an ordinary computer, or a dedicated calculation circuit, etc. comprising an adder, a multiplier, etc.

FIG. 3 is a flowchart showing a flow of a process of a key sharing method carried out by the first key sharing apparatus 102. The processes carried out by the respective key sharing apparatuses 102 are the same. However, in order to facilitate understanding of the background of the theory of the present invention, the respective processes are to be explained sequentially.

It is assumed as a premise that both of the key sharing apparatuses 102 share a public key X which belongs to $GF(n)$. This public key X may be open to others.

For easier understanding, specific values will be employed in the explanation below. For example, let it be assumed that $n=2^{200}=1606938044258990275541962092341162602522202993782792835301376$, and $X=123$.

In the first key sharing apparatus 102, the integer obtaining unit 103 obtains an integer p which is equal to or larger than 2, and smaller than n (step S301). For example, let it be assumed that "251" is selected as p (p=251).

Then, the transmission key calculation unit 104 calculates a transmission key $Y \in GF(n)$ using the obtained integer p based on $$Y = T(p, X)$$

(step S302). When using the above described values, the calculation results in that $Y=1051937263758371990097586384146037381059241137335343438748379$.

Then, the transmission key sending unit 105 sends the calculated transmission key Y to the second key sharing apparatus 102 (step S303).

Likewise in the second key sharing apparatus 102, the integer obtaining unit 103 obtains an integer q which is equal to or larger than 2, and smaller than n (same as step S301). For example, let it be assumed that q=127.

The transmission key calculation unit 104 calculates a transmission key $W \in GF(n)$ using the obtained integer q based on $$W = T(q, X)$$

(same as step S302). When using the above specified values, the calculation results in that $W=389805704436066900356221107082190652128452589999625926802555$.

Then, the transmission key sending unit 105 sends the calculated transmission key W to the first key sharing apparatus 102 (same as step S303).

Thus, the respective key sharing apparatuses obtain the integers p and q, calculate the values Y and W respectively, and send the calculated values to the other.

The transmission key reception unit 106 of the first key sharing apparatus 102 receives the transmission key W sent from the second key sharing apparatus 102 (step S304).

Then, the common key calculation unit 107 calculates a common key $Z \in GF(n)$ using the received transmission key W based on $$Z = T(p, W)$$

step S305). In this example, this calculation results in that $$Z=120921919521041787377862142370015884214284825184923\\0516156.$$

On the other hand, the transmission key reception unit 106 of the second key sharing apparatus 102 receives the transmission key Y sent from the first key sharing apparatus 102 (same as step S304).

The common key calculation unit 107 calculates a common key $Z' \in GF(n)$ using the received transmission key Y based on $$Z'=T(q, Y)$$

(same as step S305). In this example, the calculation results in that $$Z'=120921919521041787377862142370015884214284825184923\\0516156.$$

That is, it is turned out that $Z=Z'$.

Note that a Chebyshev polynomial has a characteristic described below.

$$S(p, S(q, x))=S(q, S(p, x))=S(pq, x)$$

Accordingly, a polynomial $T(\bullet, \bullet)$ which is obtained by moving the Chebyshev polynomial into the Galois finite field GF(n), has a similar characteristic as follows.

$$T(p, T(q, x))=T(q, T(p, x))=T(pq, x)$$

Since it is satisfied that:

$$Z=T(p, W); Y=T(p, X);$$

$$Z'=T(q, Y); \text{ and } W=T(q, X),$$

it can be true that:

$$Z=T(p, W)=T(p, T(q, X))=T(pq, X); \text{ and}$$

$$Z'=T(q, Y)=T(q, T(p, X))=T(pq, X).$$

Accordingly, it is satisfied that $$Z=Z'.$$

As a result of the above calculations, the two key sharing apparatuses 102 share the key $Z=Z'$ which exists in the Galois finite field GF(n).

When the common key is shared between the key sharing apparatuses 102 as described above, the next step will be transmission of a message which is encrypted using this common key. The following explanation will consider a case where an encrypted message is sent from the first key sharing apparatus 102 to the second key sharing apparatus 102.

As shown in FIG. 1, the first key sharing apparatus 102 further comprises an encryption unit 111, and an encrypted message sending unit 112.

On the other hand, the second key sharing apparatus 102 further comprises an encrypted message reception unit 121, and a decryption unit 122.

FIG. 4 is a flowchart showing a flow of a process of an encryption method performed by the first key sharing apparatus 102. FIG. 5 is a flowchart showing a flow of a process of a decryption method performed by the second key sharing apparatus 102. Each of those processes needs to be performed after the above explained key sharing method is executed, and thus a common key is shared between both of the key sharing apparatuses.

In the first key sharing apparatus 102, the encryption unit 111 obtains an encrypted message by encrypting a message to be transmitted using the calculated common key Z (step S401).

The encrypted message sending unit 112 sends the encrypted message to the second key sharing apparatus 102 (step S402).

In the second key sharing apparatus 102, the encrypted message reception unit 121 receives the encrypted message sent from the first key sharing apparatus 102 (step S501).

Then, the decryption unit 122 decrypts the received encrypted message using the calculated common key Z', and thus obtains the message to be transmitted (step S502).

Various known techniques can be applied in the encryption and decryption processes using the common key $Z=Z'$.

Values taken by the Chebyshev polynomial $T(\bullet, \bullet)$ show a chaotic behavior. Therefore, even if the message transmitted between both of the key sharing apparatuses 102 is seen, it is extremely hard to guess the common key $Z=Z'$. Accordingly, the above described sharing of the key and transmission of the message are safe, and there is very low possibility that the message is improperly deciphered. Thus, secure sharing of a key and secure transmission of a message can be realized.

Second Embodiment

According to the above described first embodiment, it is possible to share a secret key between the two key sharing apparatuses 102. The present embodiment is the expanded version of the above embodiment. That is, the present embodiment will disclose another key sharing system wherein a key is shared among N ($N \geq 2$) number of key sharing apparatuses $M_0, M_i, \ldots, M_{N-1}$.

Figure 7:
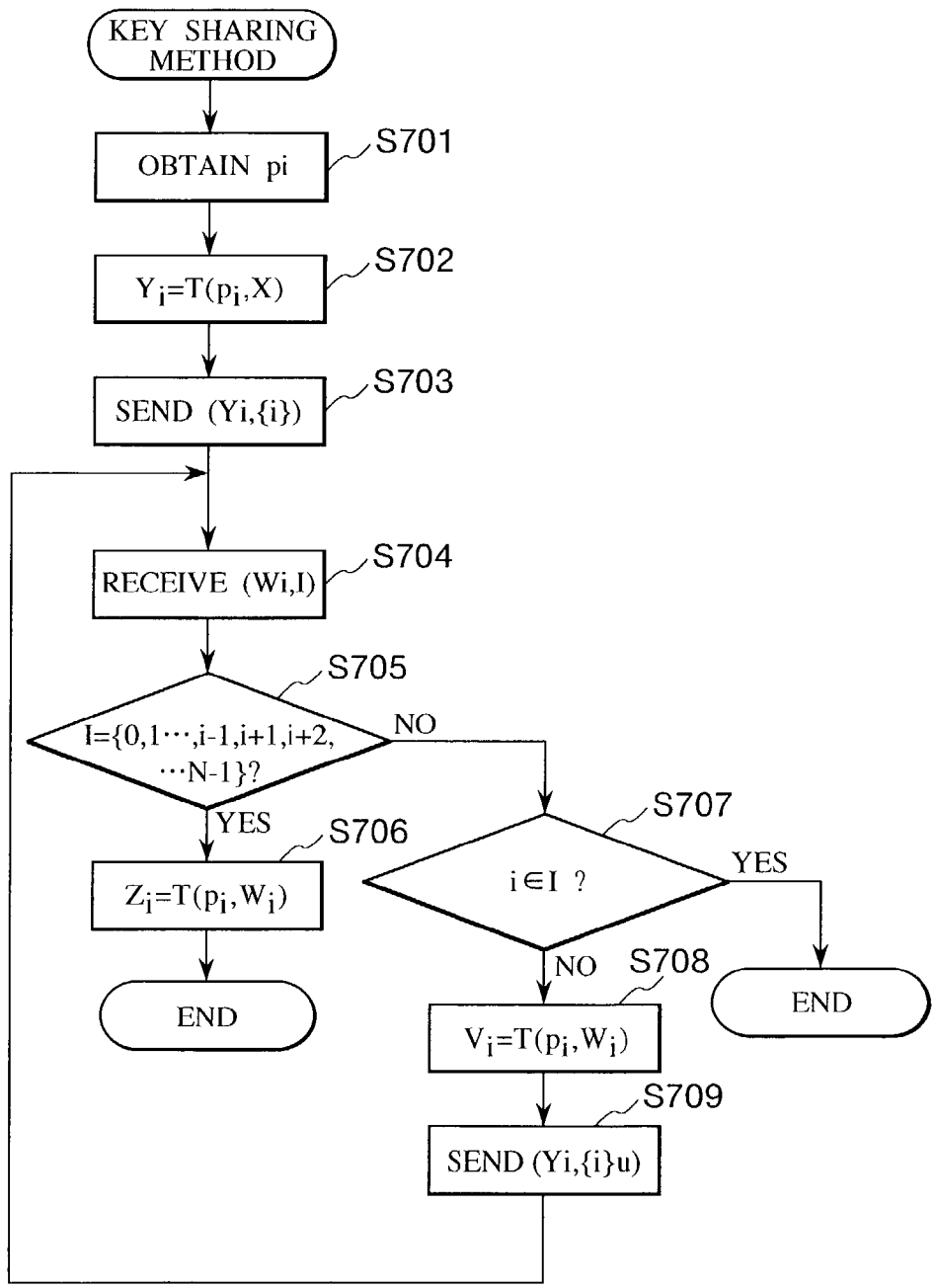
FIG. 7 is a flowchart showing a flow of a process of a key sharing method performed by the key sharing apparatus $M_i$ according to the second embodiment.

FIG. 6 is an exemplary diagram showing a schematic structure of each key sharing apparatus $M_i$ ($0 \leq i \leq N-1$) according to the present embodiment. FIG. 7 is a flowchart showing a flow of a process of a key sharing method performed by each key sharing apparatus $M_i$ ($0 \leq i \leq N-1$). The following explanation will be made with reference to those drawings.

A key sharing apparatus $M_1$ 601 comprises an integer obtaining unit 602, an initial transmission key calculation unit 603, an initial transmission key sending unit 604, a transmission key reception unit 605, a common key calculation unit 606, an intermediate transmission key calculation unit 607, and an intermediate transmission key sending unit 608.

Likewise the first embodiment, it is assumed that each key sharing apparatus $M_1$ 601 acquires a public key X.

The integer obtaining unit 602 obtains an integer $p_i$ which is equal to or larger than 2, and smaller than n (step S701).

The initial transmission key calculation unit 603 calculates a transmission key $Y_i$ using the obtained integer $p_i$ based on $$Y_i=T(p_i, X)$$

(step S702).

Then, the initial transmission key sending unit 604 sends the calculated transmission key $Y_i$ and polynomial application information representing that only this instant key sharing apparatus $M_1$ 601 applies the polynomial thereby to calculate the transmission key $Y_i$, to another key sharing apparatus 601 among the plurality of key sharing apparatuses 601 (step S703).

If the polynomial application information is represented as a set, the entire information to be sent can be represented as $(Y_i, \{i\})$.

The transmission key reception unit 605 receives a transmission key $W_i \in GF(n)$, and polynomial application information I regarding the transmission key $W_i \in GF(n)$, from any one of the plurality of key sharing apparatuses 601 (step S704). That is, the received information is ($W_i$, I).

The key sharing apparatus $M_1$ 601 determines whether the received polynomial application information represents or not that all the key sharing apparatuses 601 among the plurality of key sharing apparatuses 601 except the key sharing apparatus $M_1$ 601 have applied the polynomial (step S705). That is, the key sharing apparatus $M_1$ 601 determines whether or not I={0, 1, 2, . . . , i−1, i+1, i+2, . . . , N−2, N−1}.

In a case where the polynomial application information represents so (step S705; Yes), the common key calculation unit 606 calculates a common key $Z_i$ using the obtained integer $p_i$ and the received transmission key $W_i$ based on $$Z_i = T(p_i, W_i)$$

(step S706).

On the contrary, in a case where the polynomial application information does not represent so (step S705; No), the key sharing apparatus $M_i$ 601 further determines whether or not the polynomial has been applied by the key sharing apparatus $M_i$ 601 itself, i.e., whether or not i is included in I (step S707).

In a case where i is not included in I (step S707; No), the intermediate transmission key calculation unit 607 calculates a transmission key $V_i$ using the obtained integer $p_i$ and the received transmission key $W_i$ based on $$V_i = T(p_i, W_i)$$

(step S708).

Then, the intermediate transmission key sending unit 608 sends to another key sharing apparatus 601 among the plurality of key sharing apparatuses 601, the calculated transmission key $V_i$ and the received polynomial application information to which information representing that the key sharing apparatus $M_i$ 601 has applied the polynomial, is added (step S709). Then, the flow returns to step S704.

Accordingly, the respective key sharing apparatuses 601 obtain the common key Z according to the key sharing method of the present embodiment. Specifically, the respective key sharing apparatuses 601 obtain the common key Z by applying functions $T(p_0, \bullet)$, $T(p_1, \bullet)$, . . . , $T(P_{N-1}, \bullet)$ to the public key X in various orders. Since $T(\bullet, \bullet)$ has the above described characteristic, it can be the that $$Z_0 = Z_1 = \ldots = Z_{N-1} = T(p_0 p_1 \ldots p_{N-1}, X)$$

likewise the first embodiment. Therefore, each key sharing apparatus 601 obtains the same calculation result, and thus can share a secret key.

Figure 8:
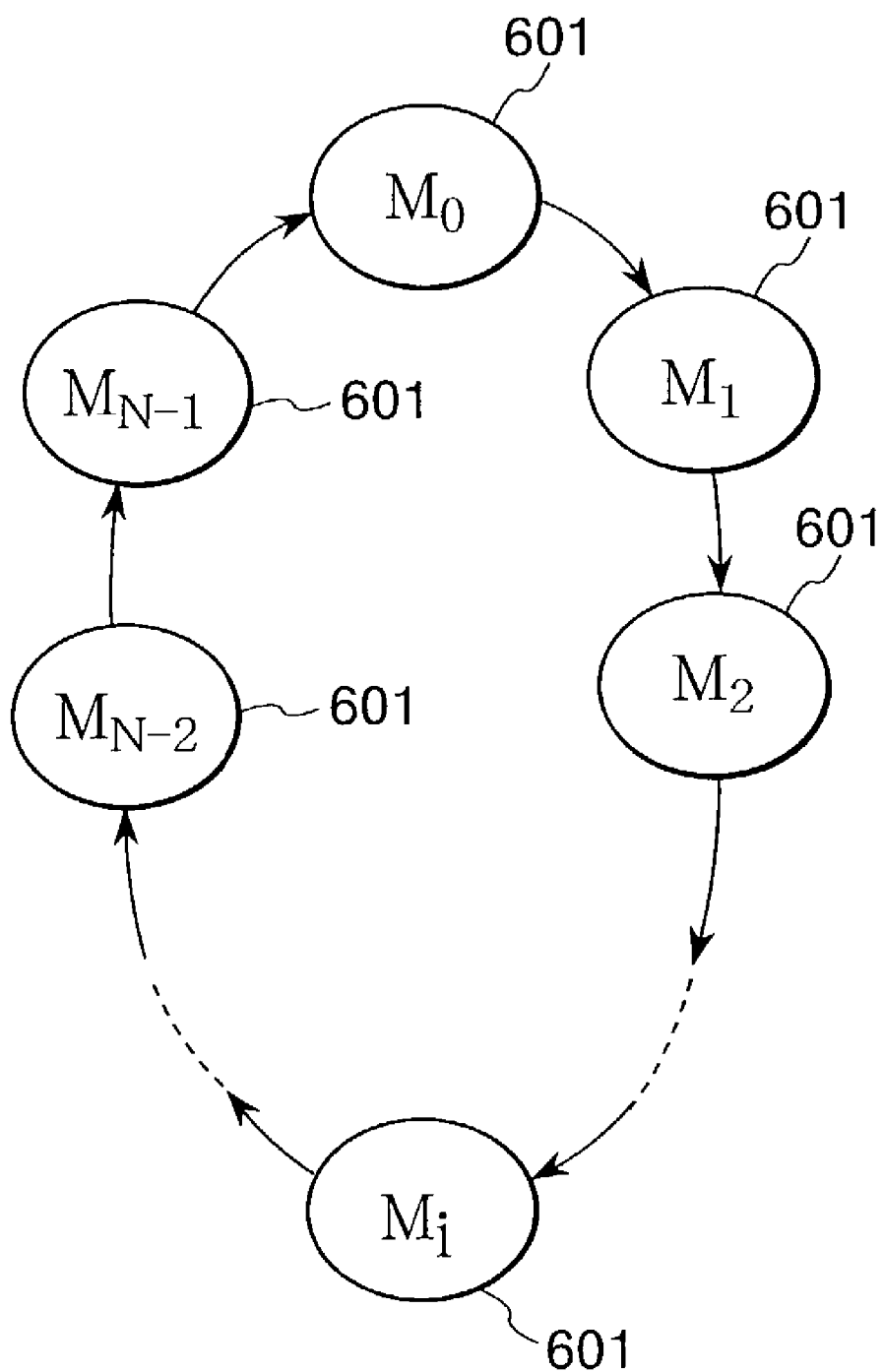
FIG. 8 is an explanatory diagram for explaining transmission and reception of a transmission key, etc. according to the second embodiment.

In the present embodiment, it can be so set that every key sharing apparatus 601 sends the transmission key and the polynomial application information to the adjacent apparatus 601. FIG. 8 is an explanatory diagram for explaining the transmission and reception of the transmission key, etc.

Each of the initial transmission key sending unit 604 and intermediate transmission key sending unit 608 of the key sharing apparatus $M_i$ 601 sends a transmission key and polynomial application information to the key sharing apparatus $M_{(i+1) \bmod N}$ 601.

The transmission key reception unit 605 of the key sharing apparatus $M_i$ 601 receives a transmission key and polynomial application information from the key sharing apparatus $M_{(i-1) \bmod N}$ 601.

As shown in FIG. 8, the transmission key, etc. are transmitted and received in a circle. If the transmission and reception are synchronously performed, every key sharing apparatus 601 can obtain a common key after the transmission and reception are repeated "N−1" number of times. In this case, "how many times the transmission and reception of the transmission key to and from an adjacent apparatus have been repeated" can be used as the polynomial application information.

After a common key can be shared among the key sharing apparatuses 601 in this way, a message can be securely transmitted using this key, likewise the first embodiment. Such a message transmission process is the same as that explained with reference to FIG. 4 and FIG. 5.

For example, a case where a message is sent from a key sharing apparatus $M_s$ ($0 \leq s \leq N-1$) 601 to a key sharing apparatus $M_t$ ($0 \leq t \leq N-1$, $t \neq s$) 601, will be considered.

The key sharing apparatus $M_s$ 601 further comprises an encryption unit, and an encrypted message sending unit (same as FIG. 1, thus not illustrated).

On the other hand, the key sharing apparatus $M_t$ 601 further comprises an encrypted message reception unit and a decryption unit (same as FIG. 1, thus not illustrated).

The encryption unit of the key sharing apparatus $M_s$ 601 obtains an encrypted message by encrypting a message to be transmitted using a calculated common key $Z_s$ (corresponding to step S401). The encrypted message sending unit sends the encrypted message to the key sharing apparatus $M_t$ (corresponding to step S402).

The encrypted message reception unit of the key sharing apparatus $M_t$ 601 receives the encrypted message sent from the key sharing apparatus $M_s$ 601 (corresponding to step S501). Then, the decryption unit decrypts the received encrypted message using the calculated common key $Z_t$, and obtains the message to be transmitted (corresponding to step S502).

As described above, sharing of a key and transmission of a message can be securely performed by an arbitrary (equal to or larger than 2) number of key sharing apparatuses, likewise the first embodiment.

In either of the above described key sharing systems, the integer n can be defined as $$n = c^m$$

where c is a prime number, and m is an integer equal to or larger than 2. With such limitation of GF(n), an effect can be obtained that a finite field consisting of n number of elements, which is unique to n (which is set exclusively for n), is obtained.

Third Embodiment

Also in a public key cryptosystem according to the present embodiment, a message sent from an encryption apparatus will be decrypted in a decryption apparatus using GF(n) and $T(\bullet, \bullet)$, likewise the above described embodiments. In the public key cryptosystem according to the present embodiment, a public key will be created by the decryption apparatus.

Figure 9:
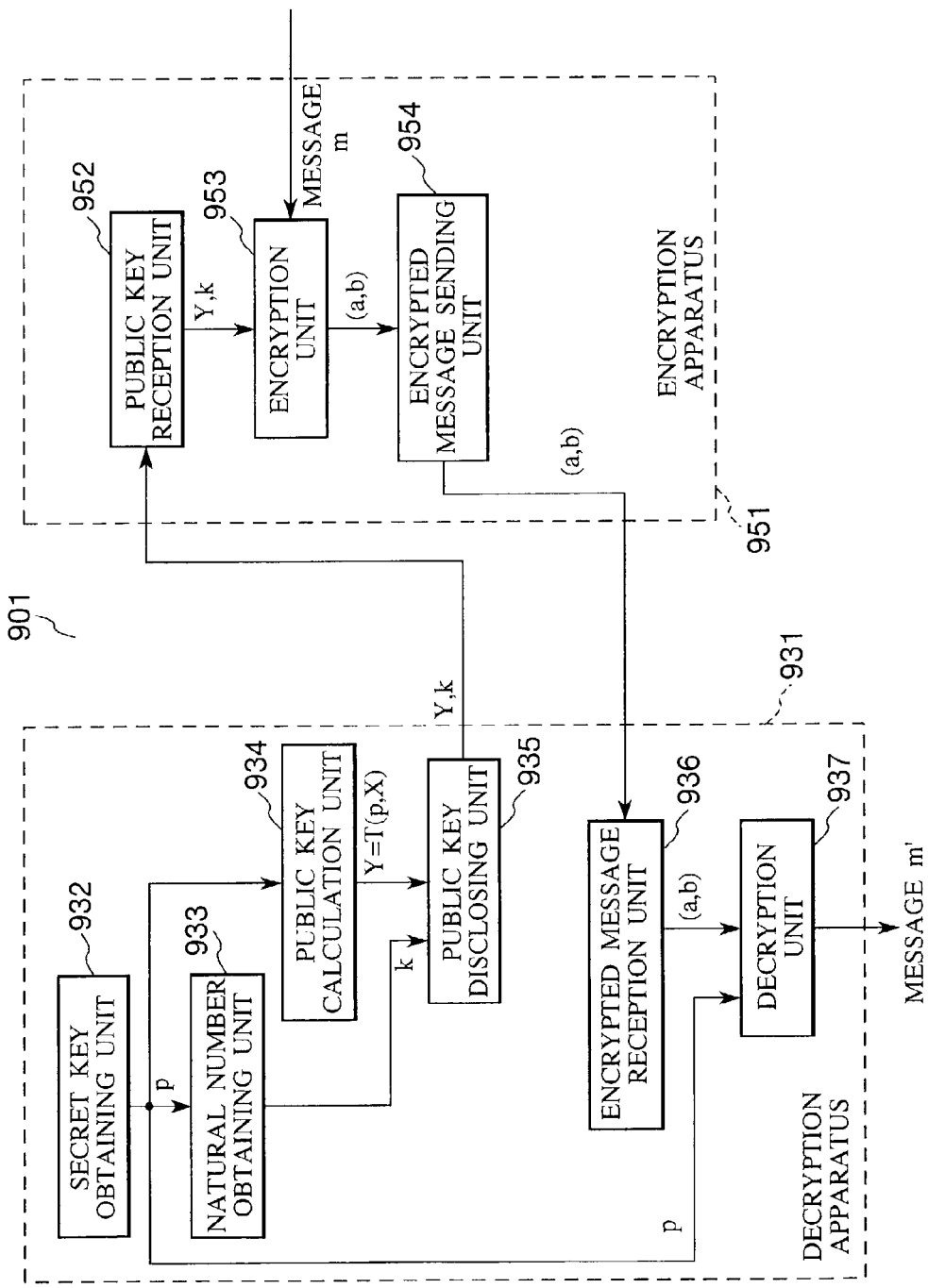
FIG. 9 is an exemplary diagram showing a schematic structure of a public key cryptosystem according to a third embodiment.

FIG. 9 is an exemplary diagram showing a schematic structure of the public key cryptosystem according to the present embodiment. The following explanation will be made with reference to this drawing.

A public key cryptosystem 901 comprises a decryption apparatus 931 and an encryption apparatus 951.

The decryption apparatus 931 comprises a secret key obtaining unit 932, a natural number obtaining unit 933, a public key calculation unit 934, a public key disclosing unit 935, an encrypted message reception unit 936, and a decryption unit 937.

The encryption apparatus 951 comprises a public key reception unit 952, an encryption unit 953, and an encrypted message sending unit 954.

Figure 10:
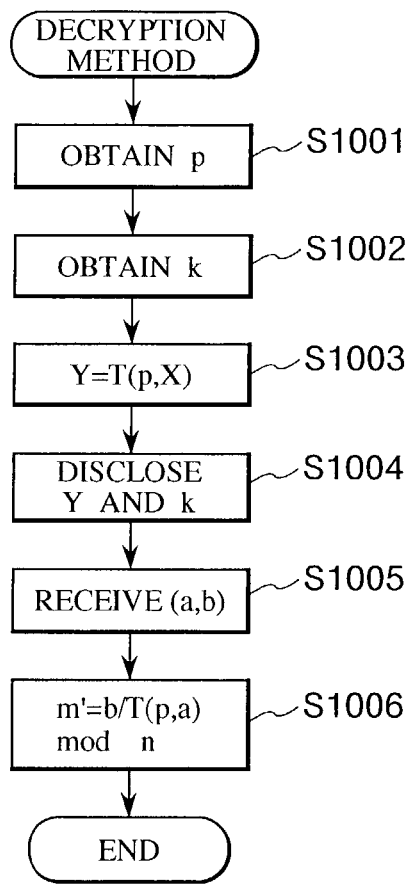
FIG. 10 is a flowchart showing a flow of a process of a decryption method performed by a decryption apparatus.
Figure 11:
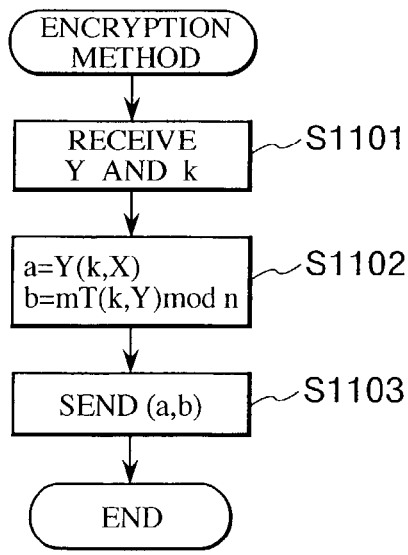
FIG. 11 is a flowchart showing a flow of a process of an encryption method performed by an encryption apparatus.

FIG. 10 is a flowchart showing a flow of a process of a decryption method performed by the decryption apparatus 931. FIG. 11 is a flowchart showing a flow of a process of an encryption method performed by the encryption apparatus 951. The following explanation will be made with reference to those drawings.

In the decryption apparatus 931, the secret key obtaining unit 932 obtains a secret key p, which is an integer equal to or larger than 2 (step S1001).

Then, the natural number obtaining unit 933 obtains a natural number k which is prime to "p−1" (where p is the secret key), and equal to or larger than 2 (step S1002).

The public key calculation unit 934 calculates a public key Y∈GF(n) using the secret key p and a public key X based on $$Y=T(p, X)$$

(step S1003).

The public key disclosing unit 935 discloses the natural number k and the public key Y to the encryption apparatus 951 (step S1004).

In the encryption apparatus 951, the public key reception unit 952 receives the natural number k and public key Y disclosed by the decryption apparatus 931 (step S1101).

Then, the encryption unit 953 calculates an encrypted message (a, b) using a message m∈GF(n) based on $$a=T(k, X)$$

$$b=mT(k, Y) \bmod n$$

(step S1102).

The encrypted message sending unit 954 sends the encrypted message (a, b) to the decryption apparatus 931 (step S1103).

In the decryption apparatus 931, the encrypted message reception unit 936 receives the encrypted message (a, b) sent from the encryption apparatus 951 (step S1005). The decryption unit 937 calculates a message m'∈GF(n) using the secret key p and the received encrypted message (a, b) based on $$m'=b/T(p, a) \bmod n$$

(step S1006).

It can be proved that m=m' from the characteristic of the function T(•, •) as described in the first and second embodiments.

In the present embodiment, the encryption apparatus 951 and the decryption apparatus 931 can use a predetermined hash function H(•) and its inverse function when encrypting/decrypting the message. A case where a hash function H(•) and its inverse function are used will be explained below.

In this case, the encryption apparatus 951 further comprises a message reception unit (not illustrated) and a hash calculation unit (not illustrated).

The decryption apparatus 931 further comprises a message obtaining unit (not illustrated).

In the encryption apparatus 951, the message reception unit receives a message M to be transmitted. Then, the hash calculation unit obtains (calculates) a message m using the received message M and a hash function H(•) for mapping the message M over GF(n) based on $$m=H(M).$$

On the other hand, in the decryption apparatus 931, the message obtaining unit obtains a message M' to be transmitted using the obtained message m' and an inverse function $H^{-1}(\bullet)$ of the hash function H(•) based on $$M'=H^{-1}(m').$$

For the above hash function H(•), a one-way function whose inverse function is difficult to calculate, and which transforms an input message into a pseudo random bit stream having a fixed length of bits, can be used. Known hash functions such as MD5 (128 bit hash), SHA (160 bit hash), etc. can be used as such a function.

Fourth Embodiment

A signature system of the present embodiment will employ the basic ideas of the key sharing systems and public key cryptosystem described in the first to third embodiment. GF(n) and T(•, •) will also be used in the present embodiment.

Figure 12:
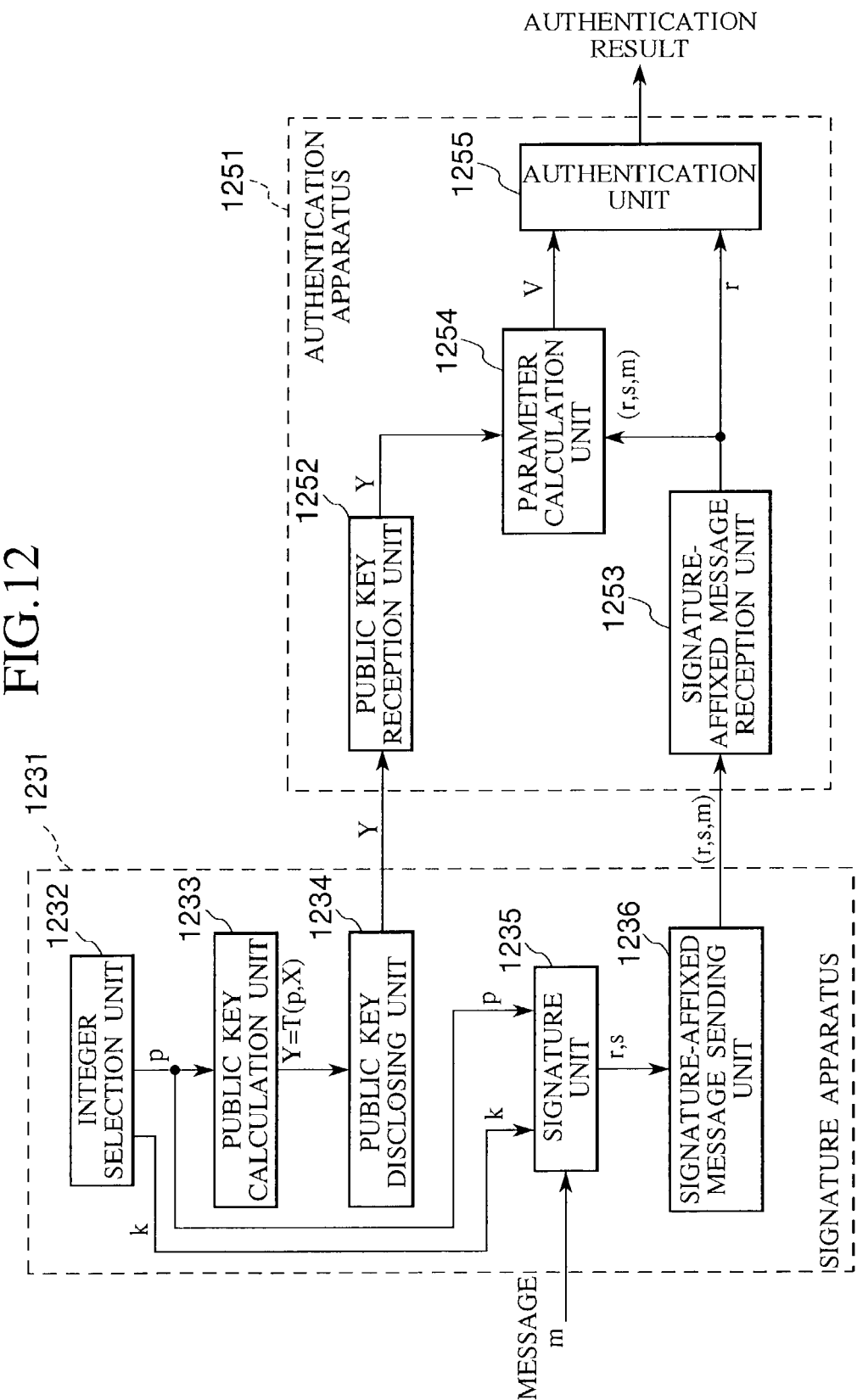
FIG. 12 is an exemplary diagram showing a schematic structure of a signature system according to a fourth embodiment.

FIG. 12 is an exemplary diagram showing a schematic structure of a signature system according to the present embodiment. The following explanation will be made with reference to this drawing.

A signature system 1201 comprises a signature apparatus 1231 and an authentication apparatus 1251. The authentication apparatus 1251 checks whether a signature included in a message is affixed by the signature apparatus 1231 or not.

It is assumed that each of the signature apparatus 1231 and the authentication apparatus 1251 obtains a lowest positive integer n* which satisfies $$T(b+n^*, U)=T(b, U)$$

where b is an arbitrary positive integer, and U is an arbitrary integer (U∈GF(n)).

The signature apparatus 1231 comprises an integer selection unit 1232, a public key calculation unit 1233, a public key disclosing unit 1234, a signature unit 1235, and a signature-affixed message sending unit 1236.

The authentication apparatus 1251 comprises a public key reception unit 1252, a signature-affixed message reception unit 1253, a parameter calculation unit 1254, and an authentication unit 1255.

Figure 13:
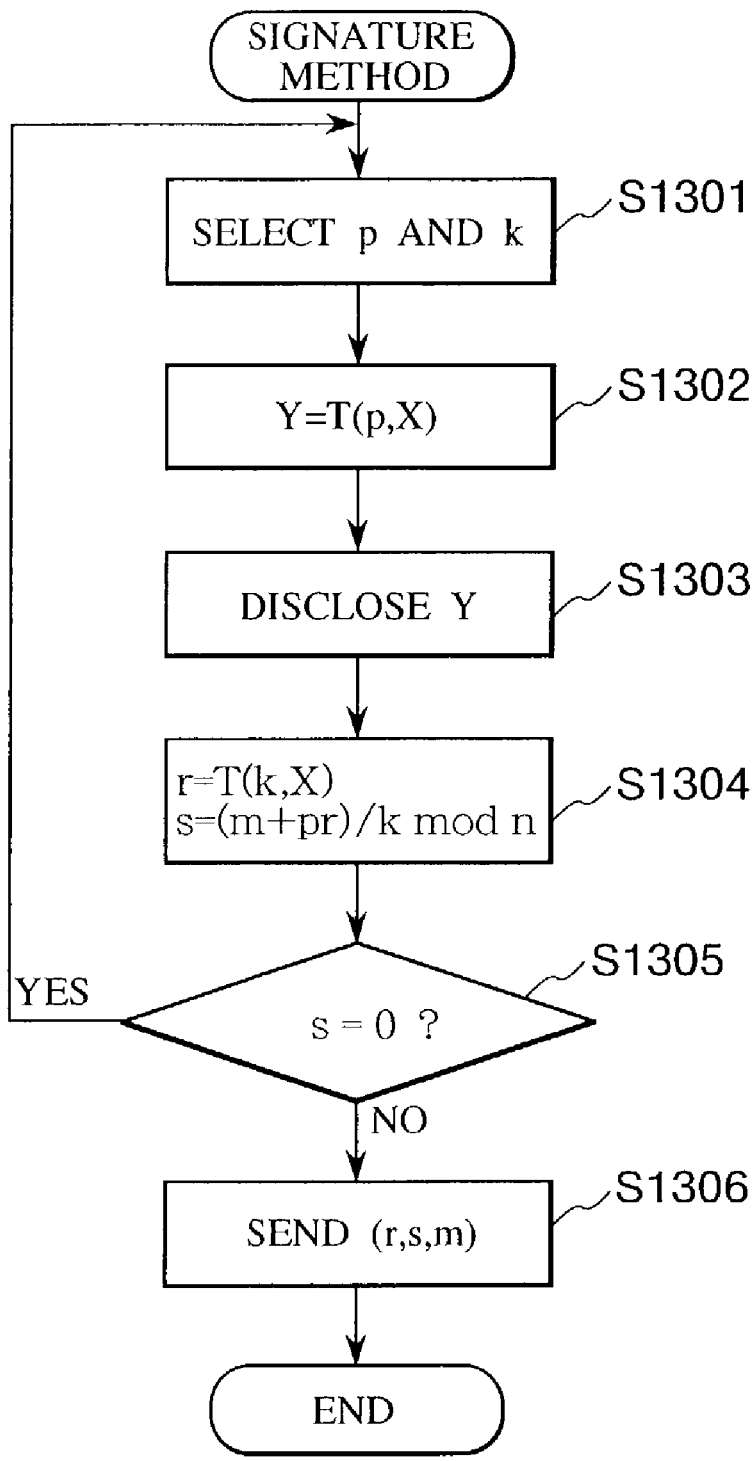
FIG. 13 is a flowchart showing a flow of a process of a signature method performed by a signature apparatus.
Figure 14:
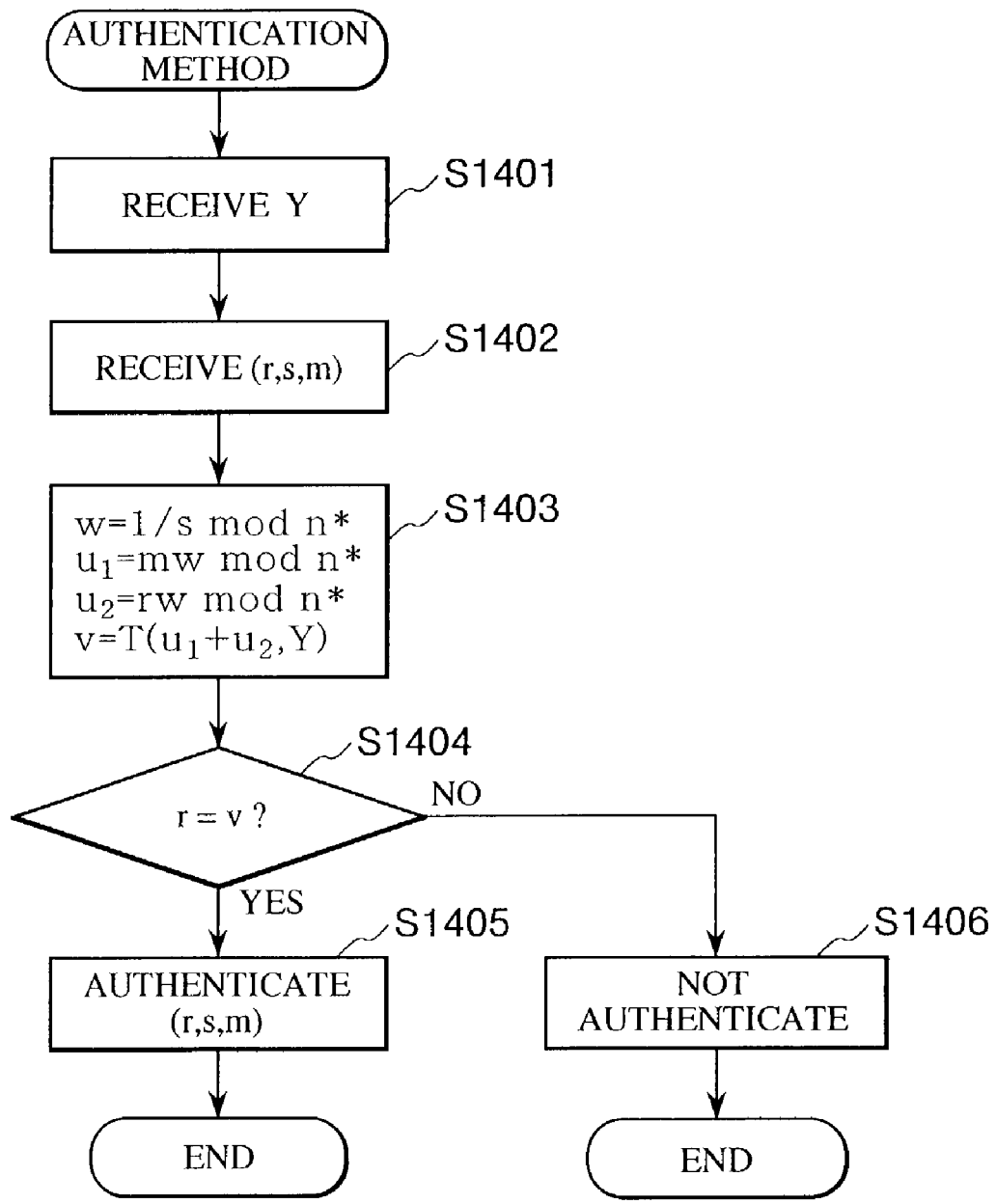
FIG. 14 is a flowchart showing a flow of a process of an authentication method performed by an authentication apparatus.

FIG. 13 is a flowchart showing a flow of a process of a signature method performed by the signature apparatus 1231. FIG. 14 is a flowchart showing a flow of a process of an authentication method performed by the authentication apparatus 1251. The following explanation will be made with reference to those drawings.

In the signature apparatus 1231, the integer selection unit 1232 selects an integer p (2≦p<min(n*, n−1)), and an integer k (2≦k<min(n*, n−1), k≠p) (step S1301).

Then, the public key calculation unit 1233 calculates a public key Y∈GF(n) using the integer p based on $$Y=T(p, X)$$

(step S1302).

The public key disclosing unit 1234 discloses the public key Y to the authentication apparatus 1251 (step S1303).

The signature unit 1235 calculates a signature-affixed message (r, s, m) using a message m (m∈GF(n)) based on $$r=T(k, X)$$

$$s=(m+pr)/k \bmod n$$

(step S1304).

Then, the signature apparatus determines whether or not it is true that s=0 (step S1305). In a case where it is true (step S1305; Yes), the flow returns to step S1301 in order to reselect one or both of the integers p and k. In a case where the public key Y, which is calculated using a pre-selected integer p, has already been disclosed, it is preferred that only the integer k be reselected. This is because the authentication apparatus 1251 can use the public key Y, in a case where it has already received it, without the need to perform data communication twice.

In a case where s≠0, the signature-affixed message sending unit 1236 sends the signature-affixed message (r, s, m) to the authentication apparatus 1251 (step S1306).

On the other hand, in the authentication apparatus 1251, the public key reception unit 1252 receives the public key Y disclosed by the signature apparatus 1231 (step S1401).

The signature-affixed message reception unit 1253 receives the signature-affixed message (r, s, m) sent from the signature apparatus 1231 (step S1402).

The parameter calculation unit 1254 calculates the following parameters $w = 1/s \bmod n$.

$u_1 = mw \bmod n^*$ $u_2 = rw \bmod n^*$ $v = T(u_1 + u_2, Y)$ using the received public key Y and the received signature-affixed message (r, s, m) (step S1403).

Then, the authentication unit 1255 determines whether or not it is true that r=v, where v is the calculated parameter, and r is an element of the signature-affixed message (r, s, m) (step S1404). In a case where it is true that r=v, the signature-affixed message (r, s, m) is successfully authenticated by the authentication unit 1255 (step S1405). In a case where it is not, the message (r, s, m) is not successfully authenticated (step S1406).

Likewise the third embodiment, the signature apparatus 1231 and the authentication apparatus 1251 may use a hash function H(•) and its inverse function, in order to hash the message.

In this case, the signature apparatus 1231 further comprises a message reception unit and a hash calculation unit (not illustrated), and the authentication apparatus 1251 further comprises a message obtaining unit (not illustrated).

In the signature apparatus 1231, the message reception unit receives a message M to be transmitted. Then, the hash calculation unit calculates a message m using the received message M and a hash function H(•) for mapping the message M over GF(n) based on $m = H(M)$.

On the other hand, in the authentication apparatus 1251, the message obtaining unit obtains the message M to be transmitted using the signature-affixed message (r, s, m) and an inverse function $H^{-1}(•)$ of the hash function H(•) based on $M = H^{-1}(m)$.

In this way, the authentication apparatus 1251 can authenticate the signature affixed to the hashed message, thus can check the true sender of the message.

As described above, according to the present invention, it is possible to provide a key sharing system, a public key cryptosystem, a signature system, a key sharing apparatus, an encryption apparatus, a decryption apparatus, a signature apparatus, an authentication apparatus, a key sharing method, an encryption method, a decryption method, a signature method, an authentication method, and programs for controlling computers to act as the above apparatuses.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-188446 filed on Jun. 21, 2001 and including specification, claims, drawings and summary. The disclosure of the above Japanese Patent Application is incorporated herein by reference in its entirety.

What is claimed is:

1. A key sharing system for enabling a first key sharing apparatus and a second key sharing apparatus to share a key, using a public key X∈GF(n) which belongs to a Galois finite field GF(n) for an integer n (n≧2), and which is equal to or larger than 2 and smaller than n, and a polynomial T(•, •) which is defined in the Galois finite field GF(n) by $T(a, x) \equiv S(a, x) \bmod n$ where S(•, •) is a Chebyshev polynomial defined by $S(a, \cos \theta) = \cos(a\theta)$ where a is an integer (a≧2), and said first key sharing apparatus and said second key sharing apparatus are connected with each other via a computer network, wherein:

(a) said first key sharing apparatus comprises
an integer obtaining unit which obtains an integer p which is equal to or larger than 2, and smaller than n,
a transmission key calculation unit which calculates a transmission key Y∈GF(n) using the obtained integer p based on the following equation $Y = T(p, X)$, and a transmission key sending unit which sends the calculated transmission key Y to said second key sharing apparatus via a computer network;

(b) said second key sharing apparatus comprises
an integer obtaining unit which obtains an integer p which is equal to or larger than 2, and smaller than n,
a transmission key calculation unit which calculates a transmission key Y∈GF(n) using the obtained integer p based on the following equation $W = T(q, X)$, and a transmission key sending unit which sends the calculated transmission key W to said first key sharing apparatus via a computer network;

(c) said first key sharing apparatus further comprises
a transmission key reception unit which receives the transmission key W sent from said second key sharing apparatus via a computer network, and
a common key calculation unit which calculates a common key Z∈GF(n) using the received transmission key W based on the following equation $Z = T(p, W)$; and (d) said second key sharing apparatus further comprises
a transmission key reception unit which receives the transmission key Y sent from said first key sharing apparatus via a computer network, and
a common key calculation unit which calculates a common key $Z' \in GF(n)$ using the received transmission key Y based on the following equation $$Z'=T(q, Y).$$

2. The key sharing system according to claim 1, wherein:
(e) said first key sharing apparatus further comprises
an encryption unit which encrypts a message to be transmitted using the calculated common key Z to obtain an encrypted message, and
an encrypted message sending unit which sends the encrypted message to said second key sharing apparatus; and
(f) said second key sharing apparatus further comprises
an encrypted message reception unit which receives the encrypted message sent from said first key sharing apparatus, and
a decryption unit which decrypts the received encrypted message using the calculated common key Z' to obtain the message to be transmitted.

3. A key sharing system for enabling a key to be shared among N ($N \geq 2$) number of key sharing apparatuses $M_0$, $M_i$, ..., $M_{N-1}$, using a public key $X \in GF(n)$ which belongs to a Galois finite field GF(n) for an integer n ($n \geq 2$), and which is equal to or larger than 2 and smaller than n, and a polynomial $T(\bullet, \bullet)$ which is defined in the Galois finite field GF(n) by $$T(a, x) \equiv S(a, x) \bmod n$$

where $S(\bullet, \bullet)$ is a Chebyshev polynomial defined by $$S(a, \cos \theta)=\cos(a\theta)$$

where a is an integer ($a \geq 2$), and said key sharing apparatus are connected with each other via a computer network, and wherein said key sharing apparatus $M_i$ ($0 \leq i \leq N-1$) comprises:
an integer obtaining unit which obtains an integer $p_i$ which is equal to or larger than 2 and smaller than n;
an initial transmission key calculation unit which calculates a transmission key $Y_i$ using the obtained integer $p_i$ based on the following equation $$Y_i=T(p_i, X);$$

an initial transmission key sending unit which sends the calculated transmission key $Y_i$ and polynomial application information representing that only said key sharing apparatus $M_i$ applies the polynomial to obtain the transmission key $Y_i$, to another key sharing apparatus among said plurality of key sharing apparatuses via a computer network;
a transmission key reception unit which receives a transmission key $W_i \in GF(n)$ and polynomial application information regarding the transmission key $W_i \in GF(n)$, from another key sharing apparatus among said plurality of key sharing apparatuses via a computer network;
a common key calculation unit which calculates a common key $Z_i$ using the obtained integer $p_i$ and the received transmission key $W_i$ based on the following equation $$Z_i=T(p_i, W_i),$$

in a case where the received polynomial application information represents that all said key sharing apparatuses among said plurality of key sharing apparatuses except said key sharing apparatus $M_i$ have applied the polynomial;
an intermediate transmission key calculation unit which calculates a transmission key $V_i$ using the obtained integer $p_i$ and the received transmission key $W_i$ based on the following equation $$V_i=T(p_i, W_i),$$

in a case where the received polynomial information does not represent so; and
an intermediate transmission key sending unit which sends the calculated transmission key $V_i$ and the received polynomial application information to which information representing that said key sharing apparatus $M_i$ has applied the polynomial is added, to another key sharing apparatus among said plurality of key sharing apparatus via a computer network.

4. The key sharing system according to claim 3, wherein:
each of said initial transmission key sending unit and intermediate transmission key sending unit of said key sharing apparatus $M_i$ sends the transmission key and the polynomial application information to a key sharing apparatus $M_{(i+1) \bmod N}$; and
said transmission key reception unit of said key sharing apparatus $M_i$ receives the transmission key and the polynomial application information from a key sharing apparatus $M_{(i-1) \bmod N}$.

5. The key sharing system according to claim 3, wherein in a key sharing apparatus $M_s$ ($0 \leq s \leq N-1$) and key sharing apparatus $M_t$ ($0 \leq t \leq N-1$, $t \neq s$) among said plurality of key sharing apparatuses:
(e) said key sharing apparatus $M_s$ further comprises
an encryption unit which encrypts a message to be transmitted using the calculated common key $Z_s$ to obtain an encrypted message, and
an encrypted message sending unit which sends the encrypted message to said key sharing apparatus $M_t$; and
(f) said key sharing apparatus $M_t$ further comprises
an encrypted message reception unit which receives the encrypted message sent from said key sharing apparatus $M_s$, and
a decryption unit which decrypts the received encrypted message using the calculated common key $Z_t$ to obtain the message to be transmitted.

6. The key sharing system according to claim 1, wherein the integer n is defined as $$n=c^m$$

where c is a prime number, and m is an integer equal to or larger than 2.

7. A key sharing apparatus, using a public key $X \in GF(n)$ which belongs to a Galois finite field GF(n) for an integer n ($n \geq 2$), and which is equal to or larger than 2 and smaller than n, and a polynomial $T(\bullet, \bullet)$ which is defined in the Galois finite field GF(n) by $$T(a, x) \equiv S(a, x) \bmod n$$

where $S(\bullet, \bullet)$ is a Chebyshev polynomial defined by $$S(a, \cos \theta)=\cos(a\theta)$$

where a is an integer ($a \geq 2$), and said key sharing apparatus being connected with another key sharing apparatus via a computer network, comprising:
an integer obtaining unit which obtains an integer p which is equal to or larger than 2, and smaller than n;

a transmission key calculation unit which calculates a transmission key Y∈GF(n) using the obtained integer p based on the following equation $$Y = T(p, X);$$

a transmission key sending unit which sends the calculated transmission key Y to said another key sharing apparatus via a computer network;

a transmission key reception unit which receives a transmission key W from said another key sharing apparatus via a computer network; and a common key calculation unit which calculates a common key Z∈GF(n) using the received transmission key W based on the following equation $$Z = T(p, W).$$

8. A key sharing apparatus, using a public key X∈GF(n) which belongs to a Galois finite field GF(n) for an integer n (n≧2), and which is equal equal to or larger than 2 and smaller than n, and a polynomial T(•, •) which is defined in the Galois finite field GF(n) by $$T(a, x) \equiv S(a, x) \bmod n$$

where S(•, •) is a Chebyshev polynomial defined by $$S(a, \cos \theta) = \cos(a\theta)$$

where a is an integer (a≧2), and said key sharing apparatus being connected with another key sharing apparatus via a computer network, comprising:

an integer obtaining unit which obtains an integer q which is equal to or larger than 2, and smaller than n;

a transmission key calculation unit which calculates a transmission key W∈GF(n) using the obtained integer q based on the following equation $$W = T(q, X);$$

a transmission key sending unit which sends the calculated transmission key W to said another key sharing apparatus via a computer network;

a transmission key reception unit which receives a transmission key Y from said another key sharing apparatus via a computer network; and a common key calculation unit which calculates a common key Z'∈GF(n) using the received transmission key Y based on the following equation $$Z' = T(q, Y).$$

9. A key sharing apparatus, using a public key X∈GF(n) which belongs to a Galois finite field GF(n) for an integer n (n≧2), and which is equal to or larger than 2 and smaller than n, and a polynomial T(•, •) which is defined in the Galois finite field GF(n) by $$T(a, x) \equiv S(a, x) \bmod n$$

where S(•, •) is a Chebyshev polynomial defined by $$S(a, \cos \theta) = \cos(a\theta)$$

where a is an integer (a≧2), said key sharing apparatus being connected with other key sharing apparatus via a computer network, said key sharing apparatus comprising:

an integer obtaining unit which obtains an integer p which is equal to or larger than 2 and smaller than n;

an initial transmission key calculation unit which calculates a transmission key Y using the obtained integer p based on the following equation $$Y = T(p, X);$$

an initial transmission key sending unit which sends the calculated transmission key Y and polynomial application information representing that only said key sharing apparatus applies the polynomial to obtain the transmission key Y, to another key sharing apparatus via a computer network;

a transmission key reception unit which receives a transmission key W∈GF(n) and polynomial application information regarding the transmission key W∈GF(n), from another of said other key sharing apparatus via a computer network;

a common key calculation unit which calculates a common key Z using the obtained integer p and the received transmission key W based on the following equation $$Z = T(p, W),$$

in a case where the received polynomial application information represents that all key sharing apparatuses except said key sharing apparatus have applied the polynomial;

an intermediate transmission key calculation unit which calculates a transmission key V using the obtained integer p and the received transmission key W based on the following equation $$V = T(p, W),$$

in a case where the received polynomial information does not represent so; and an intermediate transmission key sending unit which sends the calculated transmission key V and the received polynomial application information to which information representing that said key sharing apparatus has applied the polynomial is added, to said one of said other key sharing apparatus via a computer network.

10. A key sharing method using a public key X∈GF(n) which belongs to a Galois finite field GF(n) for an integer n (n≧2), and which is equal to or larger than 2 and smaller than n, and a polynomial T(•, •) which is defined in the Galois finite field GF(n) by $$T(a, x) \equiv S(a, x) \bmod n$$

where S(•, •) is a Chebyshev polynomial defined by $$S(a, \cos \theta) = \cos(a\theta)$$

where a is an integer (a≧2), said method comprising:

an integer obtaining step of obtaining an integer p which is equal to or larger than 2, and smaller than n;

a transmission key calculating step of calculating a transmission key Y∈GF(n) using the obtained integer p, based on the following equation $$Y = T(p, X);$$

a transmission key sending step of sending the calculated transmission key Y to another key sharing apparatus via a computer network;

a transmission key receiving step of receiving a transmission key W sent from the another key sharing apparatus via a computer network; and a common key calculating step of calculating a common key Z∈GF(n) using the received transmission key W, based on the following equation $$Z = T(p, W).$$

11. A key sharing method using a public key X∈GF(n) which belongs to a Galois finite field GF(n) for an integer n (n≧2), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), said method comprising:

an integer obtaining step of obtaining an integer q which is equal to or larger than 2, and smaller than n;

a transmission key calculating step of calculating a transmission key $W \in GF(n)$ using the obtained integer q, based on the following equation $$W = T(q, X);$$

a transmission key sending step of sending the calculated transmission key W to another key sharing apparatus via a computer network;

a transmission key receiving step of receiving a transmission key Y sent from the another key sharing apparatus via a computer network; and a common key calculating step of calculating a common key $Z' \in GF(n)$ using the received transmission key Y, based on the following equation $$Z' = T(q, Y).$$

12. The key sharing method according to claim 10 or 11, further comprising:

an encrypting step of encrypting a message to be transmitted using the calculated common key Z, to obtain an encrypted message; and an encrypted message sending step of sending the encrypted message to the another key sharing apparatus via a computer network.

13. The key sharing method according to claim 10 or 11, further comprising:

an encrypted message receiving step of receiving an encrypted message sent from the another key sharing apparatus via a computer network; and a decrypting step of decrypting the received encrypted message using the calculated common key Z', to obtain a message to be transmitted.

14. A key sharing method which enables a key to be shared among N ($N \geq 2$) number of key sharing apparatuses $M_0, M_i, \ldots, M_{N-1}$, which are connected with each other via a computer network, with use of a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(108, \bullet)$ is a Chebyshev polynomial defined by $$S(a, \cos \theta) = \cos(a\theta)$$

where a is an integer ($a \geq 2$), and [2] which is performed by said key sharing apparatus $M_i$ ($0 \leq i \leq N-1$), said method comprising:

an integer obtaining step of obtaining an integer $p_i$ which is equal to or larger than 2, and smaller than n;

an initial transmission key calculating step of calculating a transmission key $Y_i$, using the obtained integer $p_i$, based on the following equation $$Y_i = T(p_i, X);$$

an initial transmission key sending step of sending the calculated transmission key $Y_i$, and polynomial application information representing that only said key sharing apparatus $M_i$ has applied the polynomial to calculate the transmission key $Y_i$, to another key sharing apparatus among said plurality of key sharing apparatuses via a computer network;

a transmission key receiving step of receiving a transmission key $W_i \in GF(n)$ and polynomial application information regarding the transmission key $W_i \in GF(n)$, from another key sharing apparatus among said plurality of key sharing apparatuses via said computer network, a common key calculating step of calculating a common key $Z_i$, using the obtained integer $p_i$ and the received transmission key $W_i$, based on the following equation $$Z_i = T(p_i, W_i)$$

in a case where the received polynomial application information represents that all said key sharing apparatuses among said plurality of key sharing apparatuses except said key sharing apparatus $M_i$ have applied the polynomial;

an intermediate transmission key calculating step of calculating a transmission key $V_i$, using the obtained integer $p_i$ and the received transmission key $W_i$, based on the following equation $$V_i = T(p_i, W_i)$$

in a case where the received polynomial application information does not represent so; and an intermediate transmission key sending step of sending the calculated transmission key $V_i$ and the received polynomial application information to which information representing that said key sharing apparatus $M_i$ has applied the polynomial is added, to another key sharing apparatus among said plurality of key sharing apparatus via said computer network.

15. The key sharing method according to claim 14, wherein:

in each of said initial transmission key sending step and intermediate transmission key sending step, the transmission key and the polynomial application information are sent to a key sharing apparatus $M_{(i+1) \bmod N}$, via said computer network, in said transmission key receiving step, the transmission key and the polynomial application information are received from a key sharing apparatus $M_{(i-1) \bmod N}$ via said computer network.

16. The key sharing method according to claim 14, which is performed by a key sharing apparatus $M_s$ ($0 \leq s \leq N-1$) when a message is sent from said key sharing apparatus $M_s$ to a key sharing apparatus $M_t$ ($0 \leq t \leq N-1$, $t \neq s$) among said plurality of key sharing apparatuses, said method further comprising:

an encrypting step of encrypting a message to be transmitted using the calculated common key $Z_s$, to obtain an encrypted message; and an encrypted message sending step of sending the encrypted message to said key sharing apparatus $M_t$ via said computer network.

17. The key sharing method according to claim 14, which is performed by a key sharing apparatus $M_t$ ($0 \leq t \leq N-1$) when a message is sent from a key sharing apparatus $M_s$ ($0 \leq s \leq N-1$, $s \neq t$) to said key sharing apparatus $M_t$ among said plurality of key sharing apparatuses, said method further comprising:

an encrypted message receiving step of receiving an encrypted message sent from said key sharing apparatus $M_s$ via said computer network; and a decrypting step of decrypting the received encrypted message using the calculated common key $Z_t$, to obtain a message to be transmitted.

18. The key sharing method according to any one of claims 10 to 17, wherein the integer n is defined as $$n = c^m$$

where c is a prime number, and m is an integer equal to or larger than 2.

19. A program product stored on a computer, using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), and controlling a computer to function as a key sharing apparatus which comprises:
 an integer obtaining unit which obtains an integer p which is equal to or larger than 2, and smaller than n;
 a transmission key calculation unit which calculates a transmission key $Y \in GF(n)$ using the obtained integer p based on the following equation $$Y = T(p, X);$$

a transmission key sending unit which sends the calculated transmission key Y to another key sharing apparatus via a computer network;
 a transmission key reception unit which receives a transmission key W from said another key sharing apparatus via a computer network; and
 a common key calculation unit which calculates a common key $Z \in GF(n)$ using the received transmission key W based on the following equation $$Z = T(p, W).$$

20. A program product stored on a computer, using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), and controlling a computer to function as a key sharing apparatus which comprises:
 an integer obtaining unit which obtains an integer q which is equal to or larger than 2, and smaller than n;
 a transmission key calculation unit which calculates a transmission key $W \in GF(n)$ using the obtained integer q based on the following equation $$W = T(q, X);$$

a transmission key sending unit which sends the calculated transmission key W to another key sharing apparatus via a computer network;
 a transmission key reception unit which receives a transmission key Y from said another key sharing apparatus via said computer network; and
 a common key calculation unit which calculates a common key $Z' \in GF(n)$ using the received transmission key Y based on the following equation $$Z' = T(q, Y).$$

21. A program product stored on a computer, using a public key $X \in GF(n)$ which belongs to a Galois finite field $GF(n)$ for an integer n ($n \geq 2$), and which is equal to or larger than 2 and smaller than n, and a polynomial $T(\bullet, \bullet)$ which is defined in the Galois finite field $GF(n)$ by $$T(a, x) \equiv S(a, x) \bmod n$$

where $S(\bullet, \bullet)$ is a Chebyshev polynomial defined by $$S(a, \cos \theta) = \cos(a\theta)$$

where a is an integer ($a \geq 2$), and controlling a computer to function as a key sharing apparatus which comprises:
 an integer obtaining unit which obtains an integer p which is equal to or larger than 2 and smaller than n;
 an initial transmission key calculation unit which calculates a transmission key Y using the obtained integer p based on the following equation $$Y = T(p, X);$$

an initial transmission key sending unit which sends the calculated transmission key Y and polynomial application information representing that only said key sharing apparatus applies the polynomial to obtain the transmission key Y, to another key sharing apparatus via a computer network;
 a transmission key reception unit which receives a transmission key $W \in GF(n)$ and polynomial application information regarding the transmission key $W \in GF(n)$, from another key sharing apparatus via said computer network;
 a common key calculation unit which calculates a common key Z using the obtained integer p and the received transmission key W based on the following equation $$Z = T(p, W),$$

in a case where the received polynomial application information represents that all key sharing apparatuses except said key sharing apparatus have applied the polynomial;
 an intermediate transmission key calculation unit which calculates a transmission key V using the obtained integer p and the received transmission key W based on the following equation $$V = T(p, W),$$

in a case where the received polynomial information does not represent so; and
 an intermediate transmission key sending unit which sends the calculated transmission key V and the received polynomial application information to which information representing that said key sharing apparatus has applied the polynomial is added, to another key sharing apparatus via said computer network.

* * * * *